United States Patent
Gaudette

(10) Patent No.: US 7,958,454 B2
(45) Date of Patent: Jun. 7, 2011

(54) GRAPHICAL STATE MACHINE BASED PROGRAMMING FOR A GRAPHICAL USER INTERFACE

(75) Inventor: Thomas Gaudette, Jamaica Plain, MA (US)

(73) Assignee: The MathWorks, Inc., Natick, MA (US)

( * ) Notice: Subject to any disclaimer, the term of this patent is extended or adjusted under 35 U.S.C. 154(b) by 540 days.

(21) Appl. No.: 11/110,182

(22) Filed: Apr. 19, 2005

(65) Prior Publication Data
US 2006/0235548 A1    Oct. 19, 2006

(51) Int. Cl.
G06F 3/00      (2006.01)
G06F 3/048     (2006.01)

(52) U.S. Cl. .................................. 715/763; 715/762
(58) Field of Classification Search .............. 700/17–18, 700/83; 715/762–763, 967; 703/13
See application file for complete search history.

(56) References Cited

U.S. PATENT DOCUMENTS

| | | | |
|---|---|---|---|
| 4,914,568 A | 4/1990 | Kodosky et al. | |
| 5,821,934 A | 10/1998 | Kodosky et al. | |
| 5,850,548 A * | 12/1998 | Williams | 717/107 |
| 5,883,639 A * | 3/1999 | Walton et al. | 345/473 |
| 5,920,718 A * | 7/1999 | Uczekaj et al. | 717/109 |
| 6,222,537 B1 * | 4/2001 | Smith et al. | 715/762 |
| 6,384,843 B1 | 5/2002 | Harel | |
| 6,865,428 B2 * | 3/2005 | Gonzales et al. | 700/86 |
| 6,944,848 B2 * | 9/2005 | Hartman et al. | 717/124 |
| 6,981,215 B1 * | 12/2005 | Lindhorst et al. | 715/530 |
| 7,000,190 B2 * | 2/2006 | Kudukoli et al. | 715/763 |
| 7,200,838 B2 * | 4/2007 | Kodosky et al. | 717/116 |
| 7,210,117 B2 * | 4/2007 | Kudukoli et al. | 717/100 |
| 2002/0070966 A1 | 6/2002 | Austin | |
| 2002/0163535 A1 * | 11/2002 | Mitchell et al. | 345/744 |
| 2003/0040812 A1 * | 2/2003 | Gonzales et al. | 700/19 |
| 2003/0040813 A1 * | 2/2003 | Gonzales et al. | 700/19 |
| 2003/0074088 A1 * | 4/2003 | Gonzales et al. | 700/19 |
| 2003/0202014 A1 * | 10/2003 | Wood | 345/763 |
| 2005/0055111 A1 * | 3/2005 | Law et al. | 700/83 |

(Continued)

OTHER PUBLICATIONS

Jacob, Robert J.K., A State Transition Diagram Language for VIsual Programming, IEEE, Aug. 1985, pp. 51-59.*

(Continued)

Primary Examiner — William L Bashore
Assistant Examiner — Ashraf Zahr
(74) Attorney, Agent, or Firm — Nelson Mullins Riley & Scarborough LLP; Kevin J. Canning; Matthew T. Fagan

(57) ABSTRACT

Systems and methods are provided for the design, development and execution of a graphical user interface using a state machine based programming paradigm integrated with a componentized graphical user interface. The present invention generates a graphical state machine representation of the graphical user interface including states for elements of the graphical user interface and any events associated with these elements. The state diagram model provides a graphical structure for handling events associated with the graphical user interface, such as events generated by inputs provided by a user via a graphical user interface element. Furthermore, functionality for the graphical user interface, such as underlying control structure, state management, and event processing can be implemented with a high level textual programming language integrated with the graphical state machine.

29 Claims, 16 Drawing Sheets

U.S. PATENT DOCUMENTS

| | | | |
|---|---|---|---|
| 2005/0060684 A1* | 3/2005 | Gupta et al. | 717/105 |
| 2005/0066280 A1* | 3/2005 | Austin et al. | 715/733 |
| 2005/0257195 A1* | 11/2005 | Morrow et al. | 717/109 |
| 2006/0036999 A1* | 2/2006 | Fay et al. | 717/120 |
| 2006/0085681 A1* | 4/2006 | Feldstein et al. | 714/25 |
| 2006/0101345 A1* | 5/2006 | Chen et al. | 715/762 |
| 2006/0155526 A1* | 7/2006 | Castillo et al. | 704/1 |
| 2006/0161882 A1* | 7/2006 | Kuo et al. | 717/104 |
| 2006/0288301 A1* | 12/2006 | Hood et al. | 715/762 |
| 2007/0168943 A1* | 7/2007 | Marini et al. | 717/108 |
| 2007/0198923 A1* | 8/2007 | Kodosky et al. | 715/523 |

OTHER PUBLICATIONS

Belli, Fevzi, Finite State Testing and Analysis of Graphical User Interfaces, IEEE, 2001, pp. 34-43.*

Myers, Brad A., User-Interface Tools: Introduction and Survey, Interface Systems, IEEE, Jan. 1989, pp. 15-23.*

International Search Report for Application No. PCT/US2006/015453, dated Aug. 4, 2006.

Hamon, Gregoire et al., "An Operational Semantics for Stateflow," Fundamental Approaches to Software Engineering (FACE), pp. 229-243 (2004).

* cited by examiner

GRAPHICAL STATE MACHINE BASED PROGRAMMING FOR A GRAPHICAL USER INTERFACE

TECHNICAL FIELD

The present invention generally relates to technical computing, and, more particularly, to providing graphical finite state machine based programming for a graphical user interface.

BACKGROUND INFORMATION

Many computer programs use graphical user interfaces, referred to as GUIs, as an intuitive and convenient means to present information and functionality for users to interact with the computer program. A user can interact with a user interface through a myriad of user interface elements or widgets. A graphical user interface typically has some elements that display information only, such as labels and images, and other elements that receive input from a user through an input mechanism, such as menus, buttons and check boxes. Furthermore, these user interface elements can include a graphical element with a collection of input elements. For example, a tree widget may provide a hierarchy of widgets, where each widget has its own window, dialog or form for interacting with the computer program. In another example, a set of property sheets may have multiple tabs with each tab handling a portion of user input for the user interface. The display and input elements can be placed and arranged within a window, frame, property sheet or other container widget, which can be moved, resized, closed, etc. Users may interact with user interface elements to view display elements and modify input elements across multiple forms or screens.

The design and development of graphical user interfaces can be quite complex in considering the myriad of user interface components, and implementing event-driven and parallelism programming paradigms with state and control considerations. Although an event based model may follow a parallelism paradigm, the user interface also needs to have structure and data to track and manage state and control of information in accordance with the desired functionality. For example, it may be desired to have the execution of instructions related to an event behave differently based on the state of user interface components, or the currently assigned values to user interface components.

Furthermore, the design and development of a graphical user interface can increase in complexity with the increase in the number of user interface elements, the number of generated events, and the complexity of the desired functionality along with the related state and control of the user interface functionality. Moreover, some software programmers may be challenged by the complexities of implementing a design and development of a graphical user interface considering event-driven and parallelism paradigms.

SUMMARY OF THE INVENTION

The present invention provides systems and methods for the design, development and execution of a graphical user interface using a state machine based programming paradigm integrated with a componentized graphical user interface. In one embodiment, the present invention generates a state diagram model having a finite state machine representation of the graphical user interface. The state diagram model includes states representing elements of the graphical user interface and any events associated with these elements. The state diagram model provides a graphical structure for handling events associated with the graphical user interface, such as events generated by inputs provided by a user via a graphical user interface element. Furthermore, functionality for the graphical user interface, such as underlying control structure, state management and event processing can be implemented with a high level textual programming language integrated with the state machine.

Additionally, in another embodiment, the present invention provides a graphical execution environment for executing a graphical model, such as a state diagram model, implementing the state machine representation of the graphical user interface. The graphical execution environment provides a visual and interactive debugging and simulating environment for executing the graphical user interface. Also, the present invention provides systems and methods for automatically generating code from the state diagram model. The code can be used to build an executable form of the state machine implementation of the graphical user interface on a target hardware platform and operating system.

The techniques of the present invention provide for a graphical programming implementation of an event-based model paradigm for a graphical user interface. Furthermore, the present invention provides a visual formalism of the graphical user interface and incorporates a textual programming language to capture data flow related processing to facilitate implementing user interface related algorithms and computations. In summary, the techniques of the present invention provides a more seamless integration of a graphical event-driven model and a componentized user interface model with a textual programming language to simplify the design and development of graphical user interfaces.

In one aspect, the present invention is related to a method for providing a graphical state diagram model representation of a graphical user interface. The method provides a graphical user interface comprising one or more graphical elements, and generates from the graphical user interface, a graphical state diagram model representing and/or related to the graphical user interface. The state diagram model may include a finite state machine, such as a graphical representation of the finite state machine, or any other type of state machine, such as a non-deterministic state machine. The state diagram model may include either a partial or complete implementation of the graphical user interface.

In another aspect, a method of the present invention provides in the graphical state diagram model a state diagram element identifying a state of the state machine representing a state of a graphical element of the graphical user interface. The graphical element may be any one of the following: 1) a push button, 2) a slider, 3) a radio button, 4) a check box, 5) a text field, 6) a pop-up menu, 7) a list box, 8) a toggle button, 9) a panel, and 10) a button group.

In one aspect of the present invention, the method provides in the graphical state diagram model a state diagram element identifying a state of a state machine representing an event associated with a graphical element of the graphical user interface. Also, the method may provide a graphical state diagram element comprising 1) a data element, 2) an event, 3) a truth table, 4) a graphical function, 5) a place, 6) a queue, 7) a ticket, or 8) a token. Additionally, the method may provide executable instructions associated with the graphical state diagram model to represent a portion of processing of an event associated with the graphical user interface element.

In a further aspect, a method of the present invention provides one or more of the following graphical state machine elements to represent a portion of the graphical user interface: 1) a state, 2) a transition from a state, 3) a transition to a state, 4) a decision point junction between states, and 5) a condition associated with a transition. In another embodiment, a method of the present invention may also provide an executable action associated with one of the following state machine elements to represent a portion of the graphical user interface: 1) a state, 2) a transition, and 3) a condition.

In one aspect, the present invention relates to a device readable medium having device readable instructions to execute the steps of the method, as described above, related to a method for providing a state diagram model representation of a graphical user interface.

In another aspect, the present invention relates to transmitting via a transmission medium computer data signals representing device readable instructions to execute the steps of the method, as described above, related to a method for providing a state diagram model representation of a graphical user interface.

In one aspect, the present invention relates to a method for providing a graphical user interface by executing a graphical state diagram model representation of the graphical user interface having one or more graphical elements. The method includes the steps of providing a graphical state diagram model having a state machine representation of a graphical user interface, and invoking an execution of the state diagram model to provide the graphical user interface. The method may display the graphical user interface with the execution of the graphical state diagram model. Additionally, the state diagram model may include a graphical representation of the finite state machine.

In another aspect of the present invention, a method activates a state of the state machine representing a graphical element of the graphical user interface. Furthermore, the method may also activate a first state of the state machine representing a first graphical element concurrently with an active second state of the state machine representing a second graphical element.

In one aspect, a method of the present invention executes a portion of the state machine in response to an input provided to the one or more graphical elements. In one embodiment, the method may also invoke executable instructions associated with a state of the state machine in response to an event provided by the one or more graphical elements.

In another aspect of the present invention, a method may execute the graphical state diagram model graphically in a graphical execution environment. Also, the method may automatically generate code from the graphical state diagram model to represent the state machine implementation of the graphical user interface. The code may be executed to provide execution of the state machine and/or the graphical user interface.

In one aspect, the present invention relates to a device readable medium having device readable instructions to execute the steps of the method, as described above, related to method for providing a graphical user interface by executing a state diagram model representation of the graphical user interface having one or more graphical elements.

In another aspect, the present invention relates to transmitting via a transmission medium computer data signals representing device readable instructions to execute the steps of the method, as described above, related to method for providing a graphical user interface by executing a state diagram model representation of the graphical user interface having one or more graphical elements.

In another aspect, the present invention relates to a system for providing a graphical user interface via a graphical state diagram model representation. The system comprises a graphical user interface tool and a state diagram modeling tool. The graphical user interface tool provides a graphical user interface having one or more graphical elements. The state diagram modeling tool, in communication with the graphical user interface tool, provides a graphical state diagram model representing the graphical user interface. The graphical state diagram model may include a finite or non-deterministic state machine. Additionally, the graphical user interface tool and/or the state diagram modeling tool may execute in a distributed manner on multiple computing devices in a network environment.

In one aspect of the present invention, the graphical user interface tool and/or the state diagram modeling tool generates the graphical state diagram model from the graphical user interface. The graphical state diagram model may be generated via an application programming interface of the state diagram modeling tool. In one case, the graphical user interface tool generates the graphical state diagram model upon saving the graphical user interface. In another case, the graphical user interface tool generates the graphical state diagram model, or any portion thereof, based on input activity in the graphical user interface tool, such as adding or changing a graphical user interface element.

In a further aspect of the present invention, an element of the state machine identifying a state of the state machine is used to represent a state of the one or more graphical elements. Additionally, a state of the state machine may be used to represent any event associated with the one or more graphical elements. Also, the state machine may include executable instructions representing a portion of event processing associated with the event.

In an additional aspect, the state diagram modeling tool of the present invention may execute the graphical state diagram model to provide the graphical user interface. The state diagram modeling tool may execute a portion of the state machine in response to an input provided to the one or more graphical elements. Also, the state diagram modeling tool may execute executable instructions associated with a state of the state machine in response to an event provided by the one or more graphical elements.

In yet a further aspect, the system of the present invention also includes a code generator tool. The code generator tool provides for the automatic generation of code from the graphical state diagram model to provide an executable form of the graphical user interface with the state machine.

The details of various embodiments of the invention are set forth in the accompanying drawings and the description below.

BRIEF DESCRIPTION OF THE DRAWINGS

The foregoing and other objects, aspects, features, and advantages of the invention will become more apparent and may be better understood by referring to the following description taken in conjunction with the accompanying drawings, in which.

DETAILED DESCRIPTION

Figure 1:
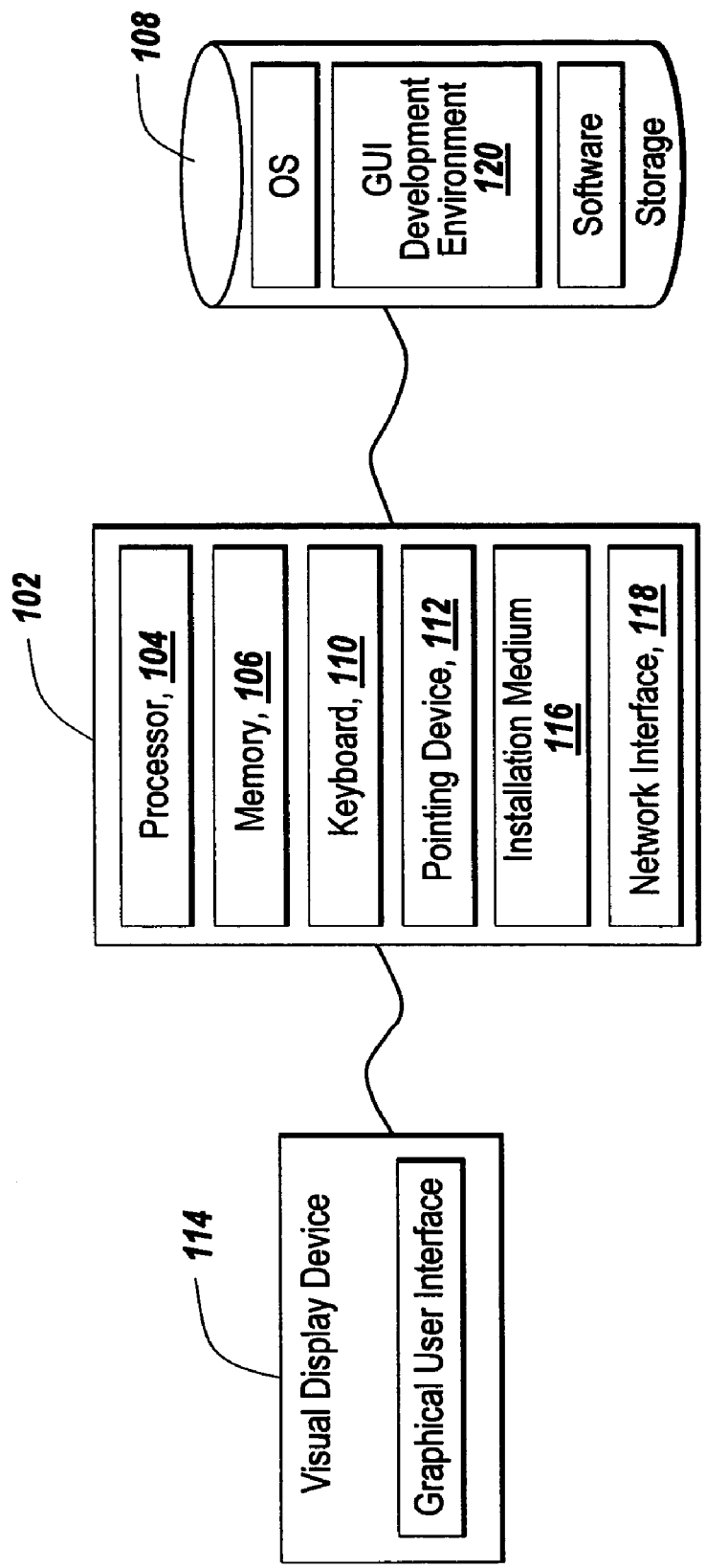
FIG. 1 is a block diagram of an illustrative computing device for practicing an embodiment of the present invention.

Certain embodiments of the present invention are described below. It is, however, expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not expressly made herein, without departing from the spirit and scope of the invention.

The illustrative embodiment of the present invention provides systems and methods for the design, development and execution of a graphical user interface using a graphical state machine based programming paradigm. The present invention provides a visual formalism implementation of the graphical user interface via a state diagram model integrated with a component based programming paradigm. The graphical user interface development environment of the present invention provides a componentized approach for providing user interface elements for a graphical user interface design, with a state and control structure underlying and related to the graphical design. The state and control structure is modeled using a hierarchical and graphical state machine that supports parallelism. Since graphical user interfaces may be event driven and contain state information, the graphical state machine representation of the user interface of the present invention is well-suited for visual formalism of graphical user interface design.

The graphical state diagram model of the present invention provides for a graphical programming implementation of an event-based model paradigm for the graphical user interface. The structure for event callback and event handling of a graphical user interface is represented and integrated with the state diagram model. Furthermore, the present invention provides a formalism using a textual language to capture data flow related processing to facilitate implementing user interface related algorithms and computations. The present invention provides a more seamless integration of the graphical event-driven model and the componentized user interface model with an integrated textual program language to simplify the design and development of graphical user interfaces.

Additionally, the illustrative embodiment of the present invention provides an environment for executing a graphical model of the user interface represented by the graphical state machine implementation and including execution of the textual language integrated with the graphical model. The graphical execution environment of the illustrative embodiment provides a visual and interactive simulator and debugger for the graphical user interface. After design and developing a graphical user interface using the techniques of the present invention, the graphical model of the user interface can be simulated to view the behavior of and validate the design. The graphical debugger helps to determine and resolve errors and diagnose unexpected behavior in the design. Active states and transition paths of the graphical state machine representation of the user interface can be viewed and examined. For example, the execution of events driven by user input via the graphical user interface can be traced and debugged.

Furthermore, the illustrative embodiment of the present invention can automatically generate code from the graphical model of the user interface having a graphical state machine and integrated textual language. The generated code may be compiled and built into a form executable by a target operating and processor environment. Although the graphical user interface is designed and developed with graphical programming and textual language techniques of the present invention, code for the graphical user interface can be generated and built into an executable form. For example, a C programming language based implementation of the graphical user interface design may be generated and compiled for a specific target hardware platform or operating system.

The illustrative embodiment will be described solely for illustrative purposes relative to a user interface, graphical model, and state diagram modeling environment provided by the software products from The MathWorks, Inc. of Natick, Mass. Although the illustrative embodiment will be described relative to a MATLAB® and/or Simulink®-based application, including the use of Stateflow®, one of ordinary skill in the art will appreciate that the present invention may be applied to other user interface, graphical model and state diagram modeling environments, such as any environments using software products of LabVIEW® or MATRIXx from National Instruments, Inc., MSC.Adams® from MSC.Software Corporation of Santa Ana, Calif., Virtuoso from Cadence of San Jose, Calif., Dymola from Dynasim AB of Lund, Sweden, Rational Rose from IBM of White Plains, N.Y., Mathematica® from Wolfram Research, Inc. of Champaign, Ill., Mathcad from Mathsoft Engineering & Education Inc., or Maple™ from Maplesoft, a division of Waterloo Maple Inc.

FIG. 1 depicts an environment suitable for practicing an illustrative embodiment of the present invention. The environment includes a computing device 102 having memory 106, on which software according to one embodiment of the present invention may be stored, a processor (CPU) 104 for executing software stored in the memory 106, and other programs for controlling system hardware. The memory 106 may comprise a computer system memory or random access memory such as DRAM, SRAM, EDO RAM, etc. The memory 106 may comprise other types of memory as well, or combinations thereof. A human user may interact with the computing device 102 through a visual display device 114 such as a computer monitor, which may be used to display a graphical user interface (GUI).

The computing device 102 may include other I/O devices such a keyboard 110 and a pointing device 112, for example a mouse, for receiving input from a user. Optionally, the keyboard 110 and the pointing device 112 may be connected to the visual display device 114. Additionally, the computing device 102 may include any type of input device for receiving user input, such as a joystick. In other embodiments, the computing device 102 may include any type of haptic or tactile feedback device, such as a vibration generating mouse, or a force feedback device such as a force feedback joystick. Also, the computing device 102 may include any type of sound producing I/O device such as any suitable sound card. The computing device 102 may include other suitable conventional I/O peripherals.

For installing software programs, the computing device 102 may support any suitable device readable medium 116, such as a CD-ROM, DVD-ROM floppy disks, tape device, USB device, hard-drive, or any other suitable device. The computing device 102 may further comprise a storage device 108, such as a hard-drive or CD-ROM, for storing an operating system and other related software. The present invention of a graphical development and execution environment 120 may comprise software that is installed via a device readable medium 116 and stored in the storage device 108. Additionally, the operating system and graphical development and execution environment 120 can be run from a bootable CD, such as, for example, KNOPPIX®, a bootable CD for GNU/Linux.

Additionally, the computing device 102 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), cluster interconnection (Myrinet), peripheral component interconnections (PCI, PCI-X), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 118 to any type of network capable of communication and performing the operations described herein. Moreover, the computing device 102 may be any computer system such as a workstation, desktop computer, server, laptop, handheld computer or other form of computing or telecommunications device that is capable of communication and that has sufficient processor power and memory capacity to perform the operations described herein.

Figure 2A:
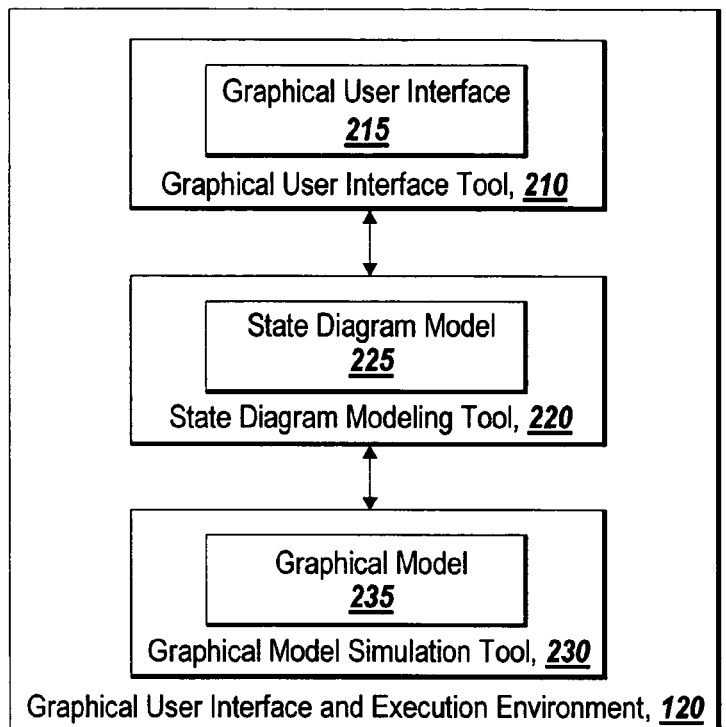
FIG. 2A is a block diagram of an illustrative graphical development and execution environment for practicing an embodiment of the present invention on the computing device of FIG. 1.

In one aspect, the present invention is related to a graphical development and execution environment 120 as illustrated in FIG. 2A. In brief overview, the illustrative graphical development and execution environment 120 includes a graphical user interface development tool ("GUI tool") 210, a state diagram modeling tool 220, and a graphical model simulation tool 230. The GUI tool 210 provides an environment for the design and development of a graphical user interface 215, and may provide a user interface component based paradigm. The state diagram modeling tool 220 provides an environment for the design and development of a graphical state machine diagram model 225, or state diagram model. The state diagram modeling tool 220 may be in communication with or have any suitable type and form of interface to the GUI tool 210. The graphical model simulation tool 230 provides an environment for the simulation and execution of a graphical model 235, such as a graphical model 235 incorporating or referencing a graphical state diagram model 225. The graphical model simulation tool 230 may be in communication with or otherwise have any suitable type and form of interface to the state diagram modeling tool 220.

The GUI tool 210 of the present invention comprises a design and development environment for creating any type and/or form of graphical user interface 215. In an exemplary embodiment and by way of example, the GUI tool 210 may comprise GUIDE, the MATLAB® Graphical User Interface Development Environment manufactured by The MathWorks, Inc. of Natick, Mass. GUIDE includes a graphical and interactive environment, as known by those ordinarily skilled in the art, by which users can create, modify, and save a graphical user interface 215. The GUI tool 210, such as GUIDE, can provide a layout editor for placing and arranging user interface elements, such as user interface components, for example, panels, buttons, text fields, sliders, and menus, into a design layout area. Additionally, the GUI tool 210 may provide an environment for programming functionality and other portions of the graphical user interface 215. For example, in the exemplary embodiment of GUIDE as the GUI tool 210, the textual programming language of MATLAB® may be use to program and implement the graphical user interface 215. One ordinarily skilled in the art will recognize and appreciate the various forms and types of graphical user interface development environments that may be used as the GUI tool 210 in practicing the operations of the present invention as described herein.

The graphical user interface 215 of the present invention may comprise any type and/or form of graphical user interface 215. In some embodiments, the graphical user interface 215 may be included in any type of client program in a client/server or distributed application or system. In other embodiments, the graphical user interface 215 may comprise any type of web page or Internet based application, such as a graphical user interface 215 implemented with a Hypertext Markup Language (HTML) or any other markup language.

Additionally, the graphical user interface 215 may comprise any elements, widgets, or components to receive input from a user or otherwise to receive input programmatically from other sources. The graphical user interface 215 may be designed with and comprise any type of widget such as a text field, edit box, choose list, combo box, check list, a push button, a slider, a check box, a pop-up menu, a list box, a toggle button, a button group, and a radio button, and may comprise any type of container widget holding, grouping, organizing, or otherwise associating one more widgets with the container widget as one ordinarily skilled in the art will appreciate. In some embodiments, a container widget may comprise a tree widget, a frame widget, a grid widget, a tab widget, a property sheet, a collection object or any custom widget or object. In other embodiments, a technical widget may be used as an element of the graphical user interface 215. A technical widget may comprise an aggregate or composition element or widget that includes a collection, representation, or implementation of one or more user interface components, such as a collection of one or more of the base user interface components of GUIDE from The MathWorks, Inc. For example, a single technical widget may be used to represent a combination or composition of a label with a text box. Additionally, any widget of the graphical user interface 215 may comprise an ActiveX control, a Java implemented control, or any custom control or widget.

Furthermore, any elements of the graphical user interface 215 may comprise any component-based user interface elements for a componentized approach to graphical user interface design and development. Any of these user interface components may be provided by any suitable means and/or mechanisms of the GUI tool 210. In one embodiment, the GUI tool 210 provides a palette or toolbox of the user interface components for dragging and dropping, or otherwise placing into a layout design area of the GUI tool 210. In other embodiments, the GUI tool 210 may provide access to user interface components via a library, file, database or other suitable storage or location accessible and readable by the GUI tool 210.

Additionally, any elements of the graphical user interface 215, such as a component based element, may include any type of means and/or mechanisms for interfacing or otherwise interacting with the element. In an exemplary embodiment, the user interface components may be object oriented and may include any type and number of properties, methods, and events. In some embodiments, the user interface component may provide events associated with input provided to the component either from a user via an input device or programmatically by executable instructions. In other embodiments, events may be provided for activation/deactivation, instantiation, or any other activity associated with the implementation of the component and as may be desired for the component's functionality. One ordinarily skilled in the art will recognize and appreciate the multitude of types and forms of graphical user interfaces and user interface elements, such as component based elements, that may be used in practicing the operations of the present invention as described herein.

The state diagram modeling tool 220 of the present invention comprises a design and development environment for creating a state machine diagram model 225 that can provide a state diagram representation of the graphical user interface 215 provided by the GUI tool 210. In an exemplary embodiment and by way of example, the state diagram modeling tool 220 may comprise Stateflow®, an interactive design and simulation tool for event-driven systems manufactured by The MathWorks, Inc. of Natick, Mass. The state diagram modeling tool 220, such as Stateflow®, provides elements to describe a language, logic, and systems in a visual form, such as a form that is readable, and understandable by a human user, such as a designer. In one embodiment of the present invention, the state diagram modeling tool 220 provides a visual formalism of the graphical user interface 215 in accordance with the operations of the present invention described below.

The state diagram modeling tool 220 is used to provide a state machine diagram model 225, also referred to as a state diagram model, state diagram, a state chart, or chart. In an exemplary embodiment of Stateflow®, the state machine diagram model 225 may be referred to as a Stateflow chart. A state machine diagram model 225 comprises a graphical representation of a state machine, such as a finite state machine or a non-deterministic state machine, where states and transitions form the building blocks of a system. As known to those ordinarily skilled in the art, a state machine is a representation of an event driven system where the system makes a transition from one state to another state provided any conditions associated with the transition are met. A state may be a mode of behavior that can be either active or inactive based on inputs, outputs, transitions, and conditions. A transition links one state to another state and may have a condition, such as any logic, computation, algorithm, or executable instruction, used to determine if and when a transition between states may occur. In some embodiments, a truth table, graphical or otherwise, may be used to represent the relationships between inputs, outputs, states, transitions, and conditions of a finite state machine. Although generally discussed herein as a graphical state machine, one ordinarily skilled in the art will recognize and appreciate that any type of graphical state machine, such as a finite, non-deterministic, or a virtual state machine, or any other type of state machine may be used in practicing the present invention.

The state diagram modeling tool 220 may provide elements such as states, junctions, and functions, such as graphical functions of Simulink® and/or Stateflow®, that may be placed and arranged graphically in a window, design area or otherwise collectively in a state diagram model 225. States and junctions may be connected together in the state diagram model 225 to form flows and transitions for an implementation of a state machine. The state diagram modeling tool 220 and/or state diagram model 225 may provide for parallelism in that two or more orthogonal states may be active at the same time. Additionally, the state diagram modeling tool 220 and/or state diagram model 225 may provide a mechanism for specifying transitions and/or conditions based on historical information related to execution of the state diagram model 225.

The state diagram modeling tool 220 and/or state diagram model 225 may use any type and/or form of notation for state machine representation, such as any notation known by those ordinarily skilled in the art, or any custom notation suitable for practicing the operations of the present invention. Additionally, the state diagram modeling tool 220 and/or state diagram model 225 may use any type and/or form of graphical element to visually represent such notation in a state machine diagram model 225. Furthermore, the state diagram modeling tool 220 may provide for organizing, incorporating, and referring sub-charts into a state diagram model 225. For example, a first state diagram model 225' representing a portion of an overall state machine design may be incorporated into or referenced by a top level state diagram model 225. The state diagram model 225 may be organized hierarchically into any number and/or levels of state diagram models to represent a finite state machine.

In one embodiment, the state diagram modeling tool 220 may be able to execute the graphical state diagram model 225. For example, in the exemplary embodiment of Stateflow®, the state diagram modeling tool 220 has a graphical execution and debugging environment that provides a user control of the simulation execution of the state diagram model 225, and access to debug related tasks, such as setting breakpoints. Additionally, the state diagram modeling tool 220 may display information about the state machine, such as active and inactive states during execution or other information as requested or desired by the user.

The graphical model simulation tool 230 of the present invention provides a graphical modeling environment, such as the graphical modeling environment of Simulink® from the MathWorks, Inc. of Natick, Mass., for creating, designing, simulating, testing, and verifying a graphical model 235, such as a block diagram model. In the graphical model simulation tool 230, configurable and customizable functional blocks are used to create block diagram models that may represent a design, or algorithm, for a control system, a signal processing system, a communication system, any other time-varying or dynamic system or any computational hardware device. Additionally, the graphical model simulation tool 230 comprises an automatic code generation application, such as the automatic code generator of Real-Time Workshop® from The MathWorks, Inc. of Natick, Mass., to generate source code from a graphical model 235 to translate the functionality of the graphical model 235 into a program that may be designed to run on any microprocessor, real-time operating system, or otherwise customized to run on a specific target hardware platform.

The graphical model 235 of the present invention can comprise any type and/or form of graphical model 235. The graphical model simulation tool 230 may provide any type of tools, libraries, and configuration mechanisms to graphically create and/or edit a graphical model 235. In an exemplary embodiment, the graphical model 235 may comprise a block diagram model provided by the Simulink® environment of The MathWorks, Inc. For example, the block diagram model 235 may comprise a series of different type of blocks arranged in a desired manner and connected via connection lines to represent signal values traversing the blocks. The graphical model 235 may comprise any type of element to form a graphical model, such as connectors, blocks, or any other graphical form and representation of functionality supported by the graphical model simulation tool 230. One ordinarily skilled in the art will recognize and appreciate the various forms of graphical models, and the elements and content thereof.

In one embodiment, the graphical model 235 incorporates, references, or otherwise uses the state diagram model 225 provided by the state diagram modeling tool 220. In an exemplary embodiment, Stateflow® is integrated and used with Simulink® to provide an environment combing state diagram modeling of Stateflow® with the graphical modeling of Simulink®. The graphical model 225 can include any elements provided for creating a graphical model 225 by the graphical model simulation tool 230, such as any elements of a block diagram model known by those ordinarily skilled in the art, and can include a state diagram model 225, or any portion thereof, that may be provided by the state diagram modeling tool 220. For example, the graphical model 235 may comprise a block diagram model with blocks connected as inputs and/or outputs of the state machine diagram 225.

In one embodiment, the graphical model simulation tool 230 may be able to execute the graphical model 235. For example, in the exemplary embodiment of Simulink® as known by those ordinarily skilled in the art, the graphical model simulation tool 230 has an environment that provides for the simulation and debugging of the graphical model 225. Additionally, in other embodiments, the graphical model simulation tool 230 may generate code of executable instructions representing the graphical model 235 to compile and build for executing on a target hardware platform and/or operating system.

Additionally, the GUI tool 210, state diagram modeling tool 220, and graphical model simulation tool 230 may provide for implementation of any portion or any functionality of the graphical user interface 215, the state diagram model 225 or the graphical model 235, respectively, via programming instructions in any type of programming language, text-based, high-level, interpretative or otherwise. In the exemplary embodiment of a MATLAB® and Simulink® based environment 120, any of the tools 210, 220 and 230 may provide for or use executable instructions in the form of the textual programming language of MATLAB®. One ordinarily skilled in the art will recognize and appreciate that any type and/or form of executable instructions, including interpretive programming languages, markup languages such as the HyperText Markup Language, scripting languages, and any code, such as libraries, executables, or scripts, may be used in providing the graphical user interface 215, the state diagram model 225 and/or the graphical model 235 of the present invention.

The GUI tool 210, state diagram modeling tool 220, and graphical model simulation tool 230, and any portion thereof, can comprise an application, module, service, computer program, software component, library, or any other type and/or form of executable instruction which is designed to and capable of executing the functionality of the present invention as described herein. Additionally, the GUI tool 210, state diagram modeling tool 220, and graphical model simulation tool 230, may be configured to and capable of running any of the modules, libraries or software components of the MATLAB® and/or Simulink® product family. As such, the graphical development and execution environment 120 may have all or a portion of the software components of MATLAB® and/or Simulink® installed on the computing device 102, or alternatively, accessible from another computing device on a network.

In FIG. 2A, although the GUI tool 210, state diagram modeling tool 220, and graphical model simulation tool 230 are illustrated as separate tools, one ordinarily skilled in the art will recognize and appreciate that any combination or all of these tools 210, 220 and 220 may be combined into a single application, or otherwise tightly integrated to present a single application in performing the operations of the present invention as described.

Figure 2B:
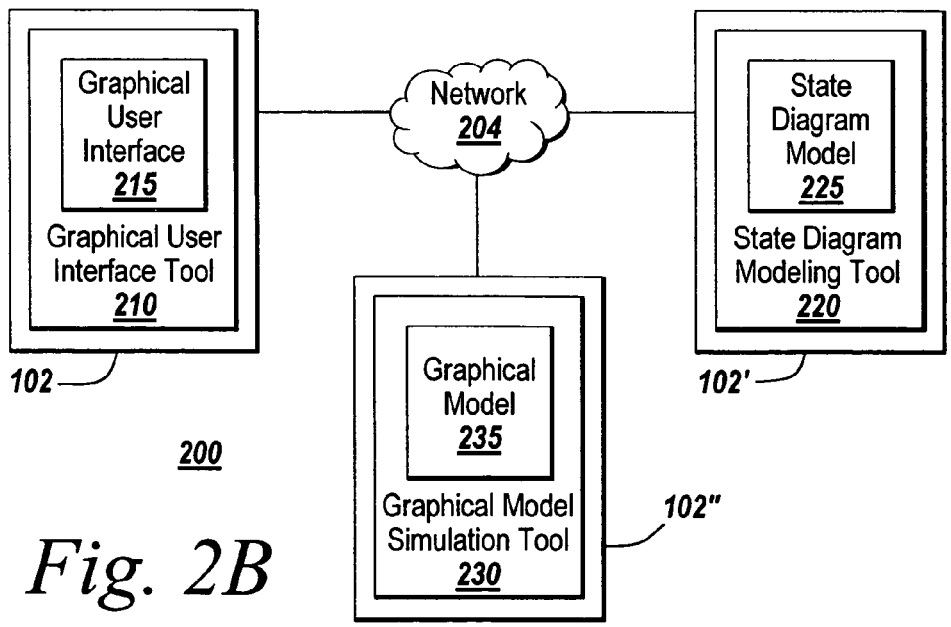
FIG. 2B is a block diagram of another illustrative graphical development and execution environment for practicing an embodiment of the present invention in a distributed manner.

FIG. 2B depicts another environment suitable for practicing an illustrative embodiment of the present invention, wherein portions of the present invention are distributed in a network environment. In a broad overview, a system 200 depicts a network 204 environment for running portions of the graphical user interface development and execution environment 120 of the present invention on multiple computing devices 102, 102' and 102". The system 200 includes multiple computing devices 102, 102', and 102" connected to and communicating over a network 204. The network 204 can be a local area network (LAN), such as a company Intranet, a metropolitan area network (MAN), or a wide area network (WAN) such as the Internet. In one embodiment (not shown), the network 204 comprises separate networks, which may be of the same type or may be of different types. The topology of the network 204 over which the computing devices 102, 102', 102" communicate may be a bus, star, or ring network topology. The network 204 and network topology may be of any such network 204 or network topology capable of supporting the operations of the present invention described herein.

The computing devices 102, 102', and 102" can connect to the network 204 through a variety of connections including standard telephone lines, LAN or WAN links (e.g., T1, T3, 56 kb, X.25, SNA, DECNET), broadband connections (ISDN, Frame Relay, ATM, Gigabit Ethernet, Ethernet-over-SONET), cluster interconnections (Myrinet), peripheral component interconnections (PCI, PCI-X), and wireless connections, or some combination of any or all of the above. Connections can be established using a variety of communication protocols (e.g., TCP/IP, IPX, SPX, NetBIOS, Ethernet, ARCNET, Fiber Distributed Data Interface (FDDI), RS232, IEEE 802.11, IEEE 802.11a, IEEE 802.11b, IEEE 802.11g, and direct asynchronous connections).

The network 204 and network connections may include any transmission medium between any of the computing devices 102, 102', and 102" such as electrical wiring or cabling, fiber optics, electromagnetic radiation or via any other form of transmission medium capable of supporting the operations of the present invention described herein. The methods and systems of the present invention may also be embodied in the form of computer data signals, program code, or any other type of transmission that is transmitted over the transmission medium, or via any other form of transmission, which may be received, loaded into, and executed, or otherwise processed and used by a computing device 102, 102' and 102" to practice the operations of the present invention as described herein.

Each of the computing devices 102, 102', and 102" may be configured to and capable of running any portion of the graphical user interface development and execution environment 120. The graphical user interface development and execution environment 120 and/or any portion thereof, such as the GUI tool 210, state diagram modeling tool 220, and graphical model simulation tool 230, can be capable of and configured to operate on the operating system that may be running on any of the computing devices 102, 102', and 102". Each computing device 102, 102', and 102" can be running the same or different operating systems. Additionally, the GUI tool 210, state diagram modeling tool 220, and graphical model simulation tool 230 can be capable of and configured to operate on and take advantage of different processors of any of the computing devices 102, 102', and 102". One ordinarily skilled in the art will recognize the various combinations of operating systems and processors that can be running on any of the computing devices.

Figure 2C:
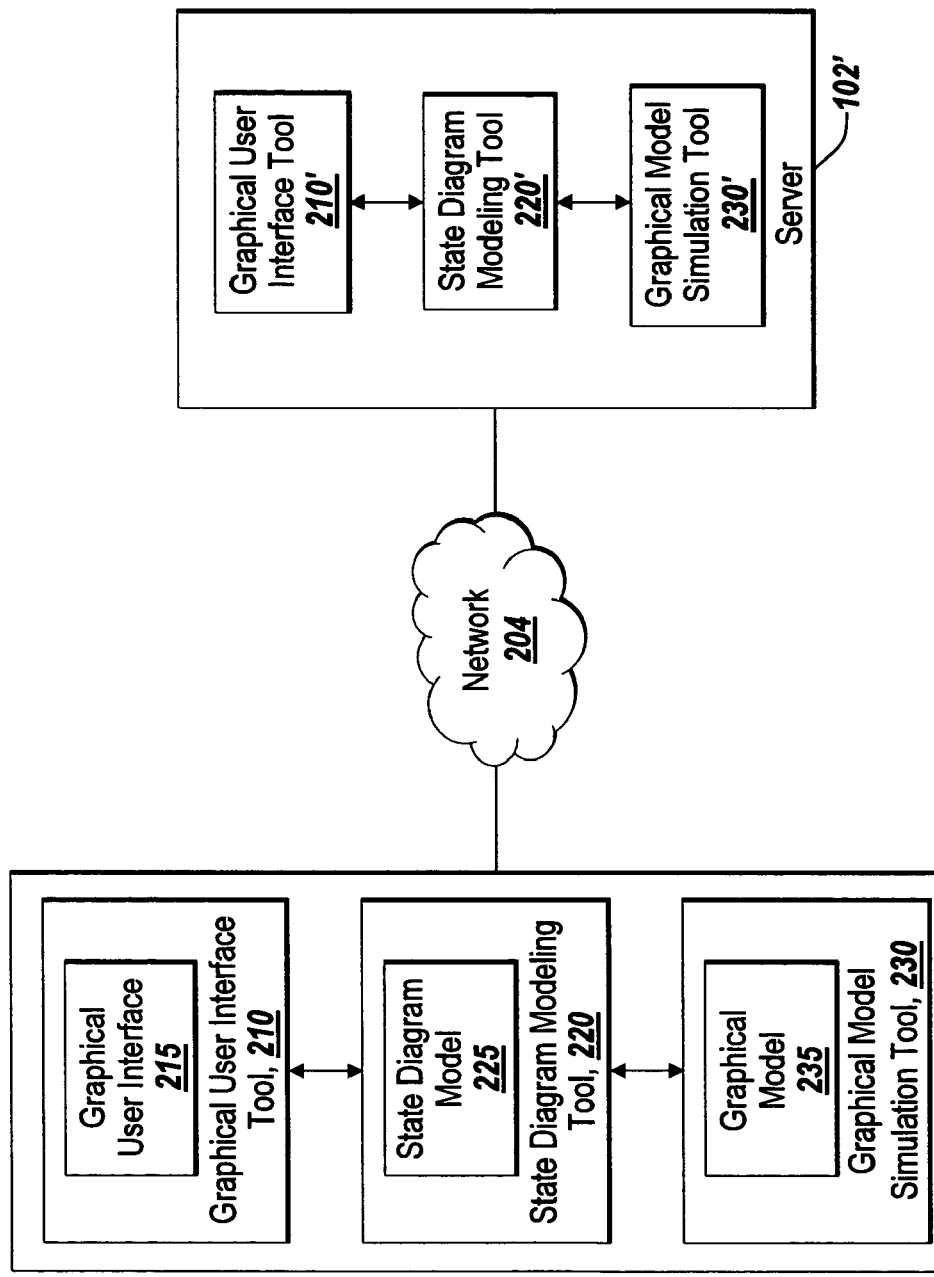
FIG. 2C is a block diagram of another illustrative graphical development and execution environment for practicing an embodiment of the present invention in a client/server environment.

FIG. 2C depicts another illustrative environment of an embodiment of the present invention, wherein portions of the present invention are practiced in a client/server architecture in a network environment. In a broad overview, the illustrative graphical user interface and execution environment 120 of the present invention includes a client computing device 102 connected to and in communication with a server computing device 102' over a network 204. The GUI tool 210, state diagram modeling tool 220, and/or graphical model simulation tool 230, can be capable of and configured to have respective portions run on each of the client 102 and the server 102'. In one embodiment, the graphical user tool 210 may have a first portion running on the client 102 and a second portion 210' running on the server. For example, the graphical user interface tool 210 may have a client portion 210 on the client 102 for providing and displaying the graphical user interface 215, and a server portion 210' on the server 102' that may include application functionality and other processing, such as storing and/or retrieving portions of the graphical user interface 215 from a database. Likewise, in other embodiments, the state diagram modeling tool 220 may also have a client portion 220 and a server portion 220', and the graphical model simulation tool 230, a client portion 230 and a server portion 230'. One ordinarily skilled in the art will recognize and appreciate how the GUI tool 210, state diagram modeling tool 220, and/or graphical model simulation tool 230 may be capable of and configured to execute with a client portion and a server portion in a client/server architecture.

Additionally, the GUI tool 210, state diagram modeling tool 220, and graphical model simulation tool 230 may be deployed such that portions of the graphical user interface 210 and/or state diagram model 225 may execute on certain portions of the network 204 and/or on certain computing devices 102, 102', or 102". For example, some functionality of the graphical user interface 215 and/or state diagram model 225 may be time critical or sensitive, and therefore may be targeted to execute on a computing device 102, 102' and 102" and a segment or portion of the network 204 with desired performance and/or operating characteristics. Other functionality of the graphical user interface 215 and/or state diagram model 225 may not be time-sensitive and may be targeted to be deployed to any computing device 102, 102', and 102" available on the network 204.

In summary, the GUI tool 210, state diagram modeling tool 220, and graphical model simulation tool 230 may be deployed across a wide range of different computing devices, different operating systems, and different processors. Furthermore, the GUI tool 210, state diagram modeling tool 220, and graphical model simulation tool 230, may be deployed in various distributed and/or client/server environments in various network topologies and configurations.

In one aspect, the present invention is directed towards providing a state machine diagram model 225 representation of a graphical user interface 215. A graphical user interface 215 may be designed and created, or otherwise provided in the GUI tool 210. Using the techniques of the present invention, the GUI tool 210, creates, generates, or otherwise provides a state diagram model 225 representing an implementation of the graphical user interface 215. The state diagram model 225 is generated in a manner such that the state machine of the state diagram model 225 includes states corresponding to events associated with the graphical user interface 215, and/or any elements thereof. The behavior and algorithms governing the functionality of the graphical user interface 215 is implemented, specified, or described in the states, transitions, conditions and other elements of the state diagram model 225. Additionally, portions of functionality of the user interface 215, such as any state, control, or event processing, can be implemented in executable instructions, such as in the high-level textual programming language of MATLAB®.

Figure 3A:
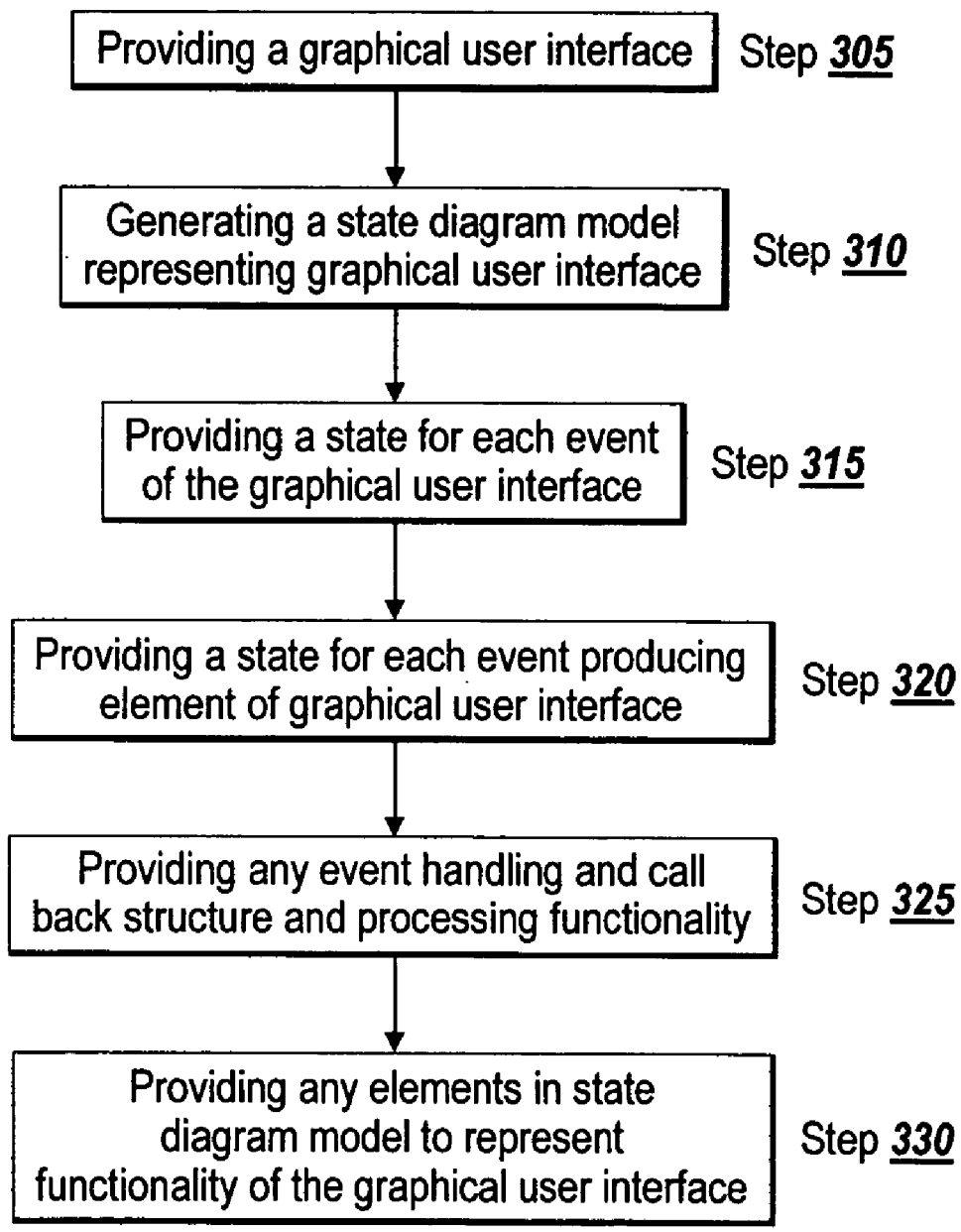
FIG. 3A is a flow diagram depicting an illustrative method for practicing an embodiment of the present invention with the illustrative graphical user interface and state diagram model of FIGS. 3B and 3C.
Figure 3B:
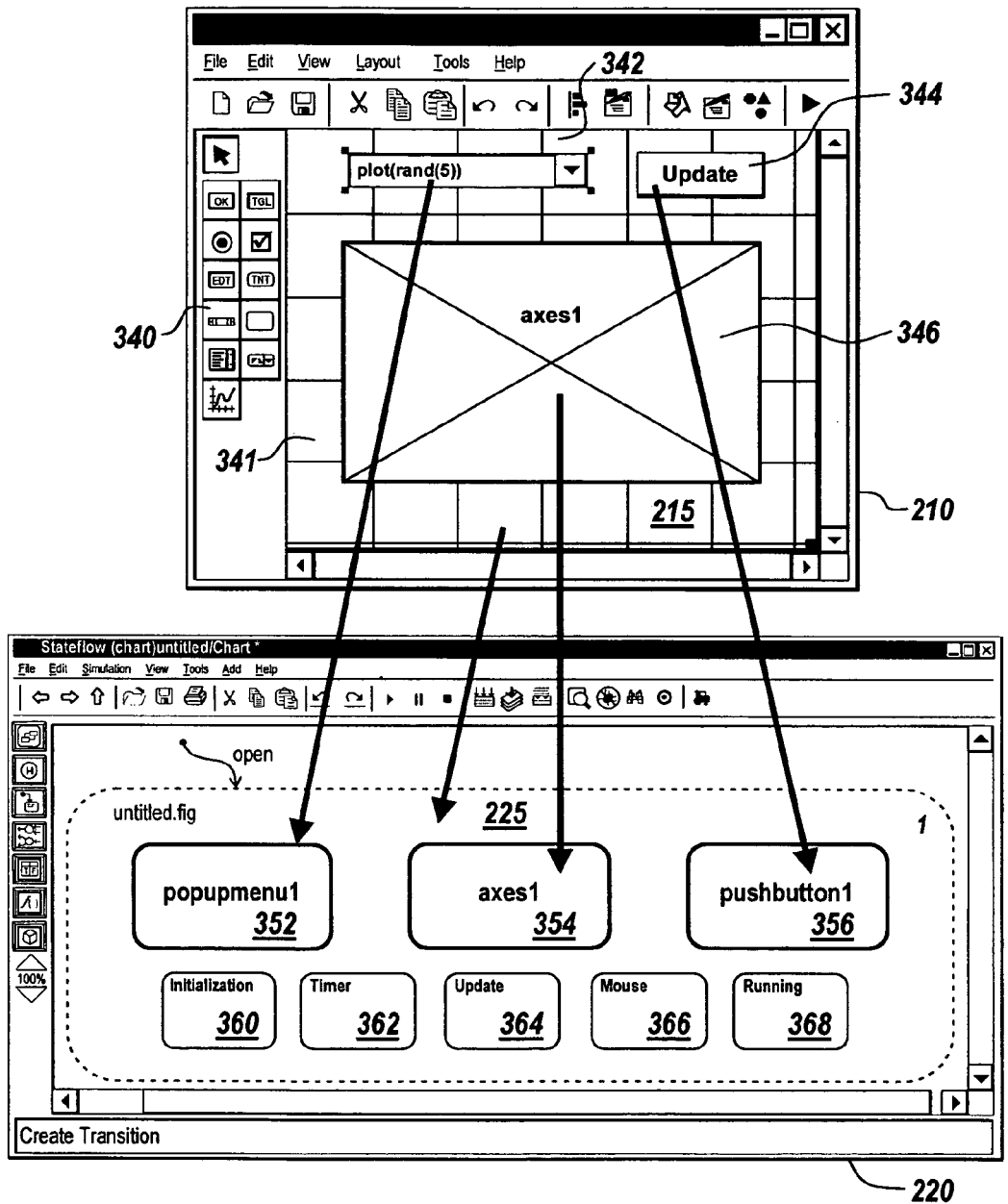
FIG. 3B is a diagrammatic view of an illustrative graphical user interface and state diagram model for practicing an embodiment of the present invention.
Figure 3C:
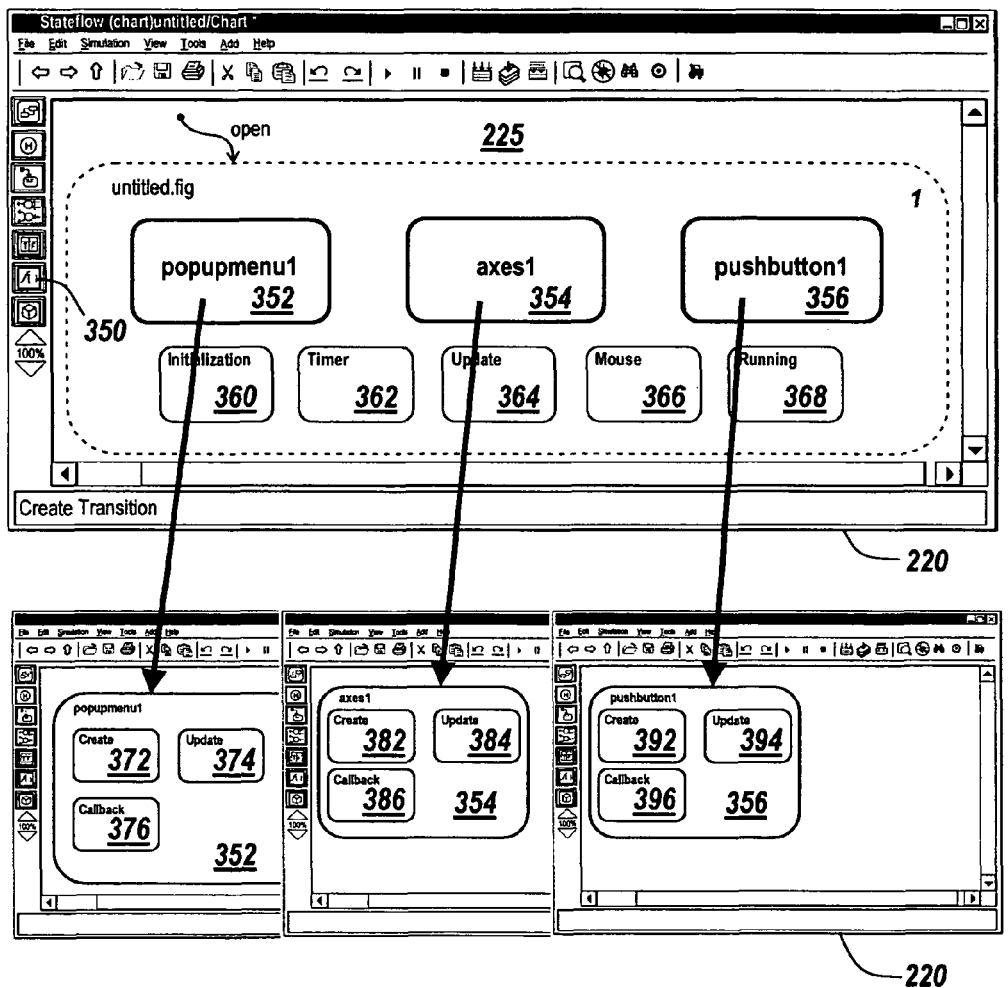
FIG. 3C is a diagrammatic view of an illustrative state diagram model for practicing another embodiment of the present invention.

FIG. 3A depicts an illustrative method 300 of practicing the techniques of an illustrative embodiment of the present invention in conjunction with the illustrative graphical user interface 215 of FIG. 3B and the illustrative state diagram model 225 of FIG. 3C. At step 305 of illustrative method 300, a graphical user interface 215 is provided, such as the graphical user interface 215 of FIG. 3B. In brief overview, the GUI tool 210 comprises a palette 340 or toolbox having one or more user interface components or elements for designing, creating or otherwise generating the graphical user interface 215. The GUI tool 210 has a design layout area and editor 341 for placing and arranging any user interface components and elements used to create the graphical user interface 215. By way of example, the design layout 341 of the graphical user interface 215 has a combo-box user interface component 342, a command button component 344, and an axes user interface component 346 for displaying a graphic or image. Although the illustrative graphical user interface 215 of FIG. 3B depicts the three elements of 342, 344 and 346, one ordinarily skilled in the art will recognize and appreciate that the graphical user interface 215 may have any number, types and forms of elements in practicing the operations of the present invention as described herein.

At step 310 of illustrative method 300, a state diagram model 225 is generated from the graphical user interface 215 provided at step 305. As step 310, a skeleton or framework of a state diagram model 225 for the graphical user interface 215, such as the illustrative state diagram model 225 of FIG. 3B, may be generated. Other elements and/or content may be provided by the remaining steps of illustrative method 300. In one embodiment, the state diagram model 225 representation of the graphical user interface 215 may be generated via the GUI tool 210. For example, the GUI tool 210 may have a command or other form of instruction accessible via any suitable user interface element to execute the generation of the state diagram model 225. In one embodiment, the GUI tool 210 generates the state diagram model 225 when the user saves the graphical user interface 215. In another embodiment, a command line interface or a command line user environment of the GUI tool 210 may be used to generate the state diagram model 225. For example, in the exemplary embodiment of a MATLAB® and Simulink® based environment 120, a MATLAB® language statement, command, function, or API may be executed to generate the state diagram model 225. In another embodiment, the GUI tool 210 generates the state diagram model 225 upon placement of the first user interface element, such as element 342, 344 or 346, is dragged and dropped, or otherwise placed onto the design layout 341 of the GUI tool 210.

The GUI tool 210 may comprise any logic, business rules, libraries or any other type and/or form of executable instructions to generate or otherwise provide the state diagram model 225 representation of the graphical user interface 215. In one embodiment, the GUI tool 210 executes any application programming interface (API) instructions of the state diagram modeling tool 220 to generate the state diagram model 225. The state diagram modeling environment 220 may comprise various application programming interfaces (APIs), such as a command line, object-oriented, or database interface, providing instructions to create, add, delete, or modify any of the elements of a state diagram model 225. In another embodiment, the GUI tool 210 may use any type and/or form of an interface mechanism, such as a message-passing or web-service interface, to provide an interface between the GUI tool 210 and the state diagram modeling environment 220.

In another embodiment of step 310 of illustrative method 300, the state diagram modeling tool 220 may obtain the graphical user interface 215 from any file representation of the graphical user interface 215 accessible and readable by the state diagram modeling tool 220. For example, the GUI tool 210 may save the graphical user interface 215 to one or more files. In the exemplary embodiment of GUIDE from The MathWorks, Inc. as the GUI tool 210, the GUI tool 210 saves the graphical user interface into two files, a FIG-file, with extension .fig, and an M-file, with extension .m. The FIG-file includes a description of the GUI layout 341 and the elements 342, 344 and 346 of the graphical user interface 215. The M-file includes any code, such as MATLAB® instructions that controls the graphical user interface 215, and may include any callbacks for the elements 342, 334 and 346.

In one embodiment, the state diagram modeling tool 220 may read the file, such as a FIG-file and M-file, for a graphical user interface 215 to generate a state diagram model 225 representation of the graphical user interface 215. In another embodiment, the state diagram modeling tool 220 may read a markup language version of the graphical user interface 215, such as an Extensible Markup Language (XML) version of the graphical user interface. The representation of the graphical user interface 215 may be transformed to a file, data or text in any format, and may be provided to or obtained by the state diagram modeling tool 220 by a file, a message, API call, or any other suitable means and/or mechanisms. In some embodiments, the state diagram modeling tool 220 may comprise any logic, business rules, libraries or any other type and/or form of executable instructions to generate or otherwise provide the state diagram model 225 representation of the graphical user interface 215.

At step 315 of the illustrative method 300, a state is provided in the state diagram model 225 for each of the elements of the graphical user interface 215, such as elements 342, 344 and 346. As depicted in the illustrative state diagram model 225 in FIG. 3B, the state 352 labeled "popupmenu1" is provided for the combo-box element 342, the state 354 labeled "axes1" is provided for the axes element 346, and the state 356 labeled "pushbutton1" is provided for the command button element 344. For each element 342, 344 and 346 of the graphical user interface 215, the respective state 352, 354 and 356 represents a mode that is either active or inactive when the state machine diagram 225 is executed in executable form. In some embodiments, only a portion of the elements 342, 344 and 346 have a state generated in the state diagram model 225. For example, in one embodiment, a state 354 may not be generated for an axes type user interface component 346 that displays a static graphic or image. In some cases, the GUI tool 210 and/or the state diagram modeling tool 220 may be configured to generate states 352, 354, 356 for specified types and/or forms of user interface elements 342, 344 and 346.

At step 320 of illustrative method 300, a state for each event associated with the graphical user interface 215 is provided in the state machine diagram model 225. As depicted in the illustrative state diagram model 225 in FIG. 3B, states 360, 362, 362, 366, and 368 are generated or otherwise provided to represent events and/or functionality associated with the graphical user interface 215. In one embodiment, the initialization state 360 is generated to represent and provide functionality for the event of the initialization of the graphical user interface 215, such as upon initiating execution of or invoking the graphical user interface 215. In another embodiment, a timer state 362 is generated to represent and provide functionality with regards to using a timer. The timer state 362 may be used to handle any timer functionality desired by any other element or functionality of the graphical user interface 215. For example, the timer state 362 may be used for setting up and handling a transaction timeout, such as a timeout of a session of using the graphical user interface 215.

The update state 364 may be generated to represent and provide functionality for a general callback event to update any portion of the graphical user interface 215. The mouse state 366 may be generated to represent and provide functionality for handling or otherwise processing any mouse related events of the graphical user interface 215. In one embodiment, the mouse state 366 handles any events generated by a pointing or input device that are not associated with a specific user interface element, such as any of the elements 342, 344 and 346. The running state 368 may be generated to represent and provide functionality with regards to the general running state of the graphical user interface 215. For example, once the graphical user interface 215 is initialized and not receiving any timer, update or mouse related events to trigger states 360, 362, 364 and 366 active, the graphical user interface 215 may actively be in the running state 368.

Any of the states 352, 354, and 356 for the user interface elements 344, 346, and 348 may be specified in the state diagram model 225 in such a manner as to allow each of the states 352, 354 and 356 to be active at the same time or in parallel with each other, i.e., parallel mode. In other embodiments, the states 352, 354 and 356 may be specified in the state diagram model 225 such that only one of the states 352, 354 and 356 may be active at a time, i.e., exclusive mode. Likewise, any of the states 360, 362, 364, 366 and 368 may be specified to be active in a parallel mode or exclusive mode to each other. Additionally, any of the states 360, 362, 364, 366 and 368 may be specified to be active in a parallel mode or exclusive mode to any other states in the top level of the state diagram model 225, such as states 352, 354 and 356.

In some embodiments of the state diagram model 225, any of the states may be specified to have a parallel or exclusive decomposition with respect to any sub-states associated with a state. A state with a parallel decomposition may comprise any sub-states that are active at the same time when the state is active and/or another sub-state is active. A state with an exclusive decomposition may comprise only one sub-state that is active when the state is active. One ordinarily skilled in the art will recognize and appreciate how states and sub-states may be specified or configured to operate in a parallel or exclusive manner.

At step 325 of illustrative method 300, the present invention provides state diagram elements in the state diagram model 225 for any event handling and callback processing related functionality related to elements of the graphical user interface 215. As depicted in FIG. 3C, for each of the user interface element states 352, 354, and 356, additional sub-states are provided corresponding to events and callbacks related to the user interface elements 342, 344, and 346. In brief overview and as illustrated in FIG. 3C, at step 325, the sub-states of create 372, update 374, and callback 376 are generated for the "popupmenu1" state 352, and the sub-states create 382, update 384, and mouseclick 386 for the "axes1" state 354. Additionally, the sub-states of create 392, update 394, and callback 396 are generated for the "pushbutton1" state 356. The states 352, 354 and 356 may be specified in the state diagram model 225 to have either a parallel or exclusive decomposition so that any sub-states may be active in parallel or exclusive to other respective sub-states. Also, the states and sub-states as illustrated in FIG. 3C form a hierarchical state diagram machine model 225 representation of the graphical user interface 215. Additionally, each of the sub-states may have further sub-states to any number of hierarchical levels desired for representing and providing for the functionality of the graphical user interface 215.

Each user interface component or element 342, 344 and 346 may generate or otherwise provide for one or more events related to the element 342, 344 and 346. As known by those ordinarily skilled in the art, a user interface element 342, 344 and 346 may have an event generated from any number of pointing device 112 and keyboard 110 related actions or by any input related activity. For example, an event may be generated for a mouse click of any type on or near the user interface element 342, 344, and 346. In another example, an event may be generated for any keyboard shortcuts typed in related to the user interface element 342, 344, and 346, for tabbing to the user interface element, or for entering any characters as input for the user interface element.

In other embodiments, an event may be generated or otherwise provided by any external type of activity or event that the graphical user interface 215 may be able to monitor or receive. For example, an event may be provided by or generated from a file being changed, such as content added to a file, or a file newly added to a directory being monitored. In another example, data may be captured or obtained by any type and/or form of device, such as a data acquisition device and any portion of the data capturing activity may generate or provide an event to the graphical user interface 215. In some embodiments, any external related event may be generated by an element of and/or associated with the graphical user interface 215, such as a widget or control that is used to interface with a file system or a data acquisition device.

Additionally, one ordinarily skilled in the art will recognize and appreciate that any user interface element may have any other type of events as desired or as implemented by the functionality of the embodiment of the user interface element. For example, a user interface element may have events related to adding, modifying or deleting items of the user interface element. Using the techniques of the present invention, at step 325 of illustrative method 300, a state may be generated or otherwise provided for any or all of the events associated with the user interface element 342, 344 and 346, or any other element of the graphical user interface 215, or any event external to the graphical user interface 215 that the graphical user interface 215 may be able to obtain or receive.

At step 330 of illustrative method 300, the present invention provides additional elements in the state diagram model 225 to represent and provide for the functionality of the graphical user interface 215. The elements provided at step 330 may be provided automatically by either the GUI tool 210 and/or the state diagram modeling tool 220, for example, by any logic, business rules or other type of executable instructions. In other embodiments, the user may specify, configure or otherwise provide additional elements in the state diagram model 225. In one embodiment, the state diagram modeling tool 220 provides a palette or a toolbox 350 providing state diagram model elements to drag and drop or otherwise place and arrange in the state diagram model 225. A user may add, modify, or edit state diagram elements or otherwise alter the state diagram model 225 using the functionality provided by the state diagram modeling tool 225 to generate the desired state machine diagram representation of the graphical user interface 215.

Figure 3D:
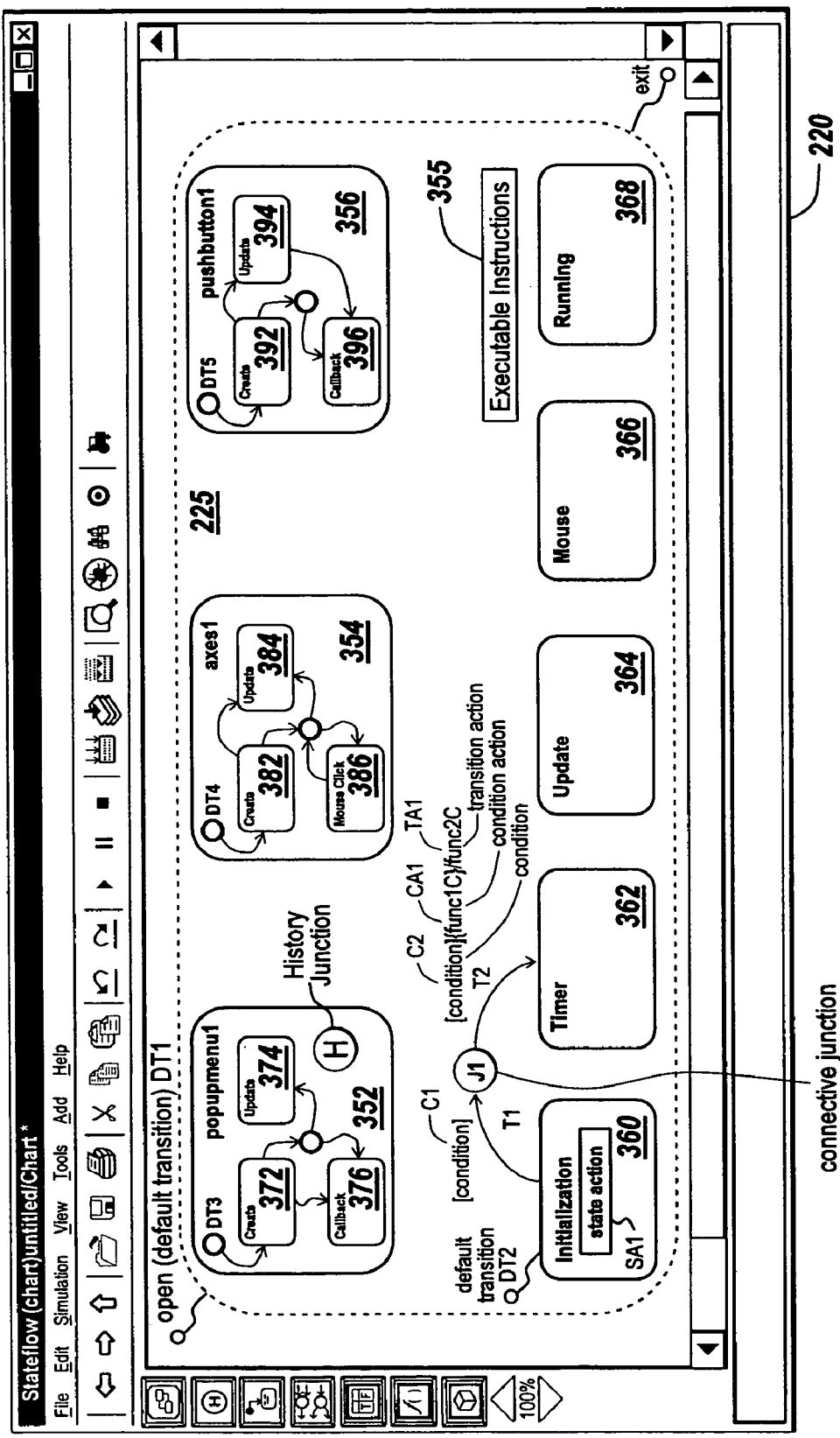
FIG. 3D is a diagrammatic view of an illustrative state diagram model for practicing a further embodiment of the present invention.

As depicted in FIG. 3D, one or more additional state diagram elements may be provided by the present invention at illustrative step 330 as depicted in the illustrative state machine diagram model 225. Although the state diagram elements will be described in an exemplary embodiment of Stateflow®, one ordinarily skilled in the art will recognize and appreciate other notation and forms of such elements that may be provided in other state diagram modeling tools 220. In one embodiment, a default transition element DT1 may be provided for transitioning into the state machine. Default transitions are used to specify which one of several states should be entered when first entering the chart 225 or a state that has sub-states. Likewise, any of the states may have a default transition, such as default transition DT2 of the initialization state 360, the default transition DT3 of the popupmenu1 state 352, and the default transitions DT4 and DT5 of the axes1 state 354 and the pushbutton1 state 356.

Additionally, at step 330, the present invention may provide for one or more transitions between states and other elements of the state diagram model 225. A transition is a graphical element that may link one state diagram element to another state diagram element, such as the arrowed lines depicted in FIG. 3D. One end of a transition is attached to a first element or source element, and the other end of the transition is attached to a second element or destination element. A transition may have labels, conditions and/or actions associated with it to specify the circumstances under which the state machine may transition from one state to another state. The processing of an event handled by the state machine may cause one or more transitions to occur.

By way of example as illustrated in FIG. 3D, the initialization state 360 may have a transition T1 to a connection action junction J1. Transitions from states to junctions may also be referred to as transition segments. The transition T1 may have an associated condition C1. In one embodiment, the condition C1 is a Boolean expression that when true causes the transition to occur. The connective junction J1 represents a decision point in the state machine between alternate transition paths taken for a single transition. A connective junction, such as junction J1, enables representation of different possible transition paths for a single transition. For example, junction J1 in FIG. 3D represents a decision point for connecting transition segment T1 from the initialization state 360 to the transition segment T3 to the running state 368. Additionally, the state machine diagram model 225 may include a history junction H as depicted in FIG. 3D. A history junction, such a history junction H, is used to represent historical decision points in the Stateflow® state diagram model 225, and can provide decision points that are based on historical data relative to state activity.

By way of further example of the types of state diagram elements used in the present invention to represent a graphical user interface 215, a transition, such as transition T2, may have a condition C2, a condition action CA1, and/or a transition action TA1. An action in the exemplary embodiment of Stateflow® is executed as part of the execution of the state diagram model 225. The action may be executed as part of a transition from one state to another state. As depicted in the illustrative state machine diagram model 225 of FIG. 3D, a transition, such as transition T2, terminating at a state, e.g., state 368, can have a condition action and/or transition action. Additionally, an action may be a state type of action based on the status of a state. For example, in the exemplary embodiment of Stateflow®, the initialization state 360 may have one or more state actions, such as state action SA1. A state action SA1 may include an action to perform on entry to the state, i.e., an entry action, an action to performing during the state, i.e., a during action, and/or an action to perform on exiting the state, i.e., an exit action. Additionally, a state action SA1 may include an action to bind data to an event, i.e., a bind action, and/or may include an action that is triggered by an event, i.e., an on event action.

Any of the actions, such as a state action SA1, condition action, CA1, a transaction action TA1, may be specified with any type and/or form of action language, which defines the types of actions that can be specified and the action's associated notations. An action may include a function call, a broadcast of an event, and an assignment of a value to a variable, or any other type and/or form of logic, functionality or executable instruction. In an exemplary embodiment, the action language may be specified with a textual language, such as the programming language of MATLAB®.

Additionally, the state diagram model 225 may include any form and/or type of executable instructions 365 to implement any portion of the state machine representation of the graphical user interface 215. In an exemplary embodiment, the executable instructions 365 may include any statements, commands, functions or instructions of the programming language of MATLAB®. In other embodiments, the executable instructions 365 may include any other programming language, such as C callable functions, as one ordinarily skilled in the art will recognize and appreciate. The executable instructions 365 may be used to represent and provide for state tracking and management, underlying control structure, and event and callback handling and processing of the graphical user interface 215. Additionally, the executable instructions 365 may be associated with, integrated with, or used by any of the state diagram elements of the state machine diagram model 225.

In an additional aspect, any of the steps 310, 315, 320, 325, and 330 of illustrative method 300 may be performed dynamically as the graphical user interface 215 is created, edited, updated, or otherwise changed in the GUI tool 220. As the graphical user interface 215 is changed, the corresponding changes to the state diagram model 220 occur. In some embodiments, as each graphical user interface element is placed in the design layout area 241 of the GUI tool 220, the state diagram model 225 may be generated or updated. For example, when the graphical user interface element 342 is placed in the design layout area 241, the state diagram model 225 may be updated to include the state 352 representing the graphical user interface element 342, such as described at illustrative step 315. In another example, if the graphical user interface element 342 is changed, then the corresponding elements of the state diagram model 225 are updated accordingly, such as described at illustrative steps 320 and 325. One ordinarily skilled in the art will recognize and appreciate how the steps of illustrative method 300 may be performed dynamically and in conjunction with graphical user interface 215 development.

Although FIGS. 3C and 3D may generally illustrate a partial implementation or representation of the functionality of the graphical user interface 215 of FIG. 3A, the illustrative method 300 of the present invention may also be used to provide a complete or full implementation of a graphical user interface 215 or a complete or full implementation of a portion of the graphical user interface 215. In some embodiments, the present invention may be used to provide a framework of a state machine diagram model 215 with some portion of the content of the state machine diagram provided for a portion of the graphical user interface. Then, the state machine diagram model 225 may be further developed and implemented to provide the representation of the graphical user interface 215 in the state diagram model 225 in a desired manner. In other embodiments, the present invention may be used to provide a working, full and/or complete implementation of the graphical user interface 215, or for a portion of the graphical user interface, such as a specific form, model, or user interface. One ordinarily skilled in the art will recognize and appreciate how the present invention may be used to provide an approach of a partial implementation or a framework representation of the graphical user interface, and/or also be used to provide a complete working implementation of the graphical user interface in the state diagram model.

Furthermore, although FIGS. 3C and 3D may generally illustrate a state diagram model 225 representation of the graphical user interface 215 of FIG. 3B having a relationship of a state corresponding to an element or widget of the graphical user interface 215, the state machine diagram model 225 representation of the graphical user interface 215 may be driven by the data, the events, the states, the objects, or any other aspect and/or functionality of the graphical user interface 215. For example, an object-oriented state diagram modeling approach may be used. In other examples, states and/or transition between states may be used to represent any state, function, data, or object of the graphical user interface 215. One ordinarily skilled in the art will recognize and appreciate that various approaches, methods, and/or techniques may be used for mapping the elements and the functionality of the graphical user interface 215 to a representation in a state diagram model 225.

Figure 3E:
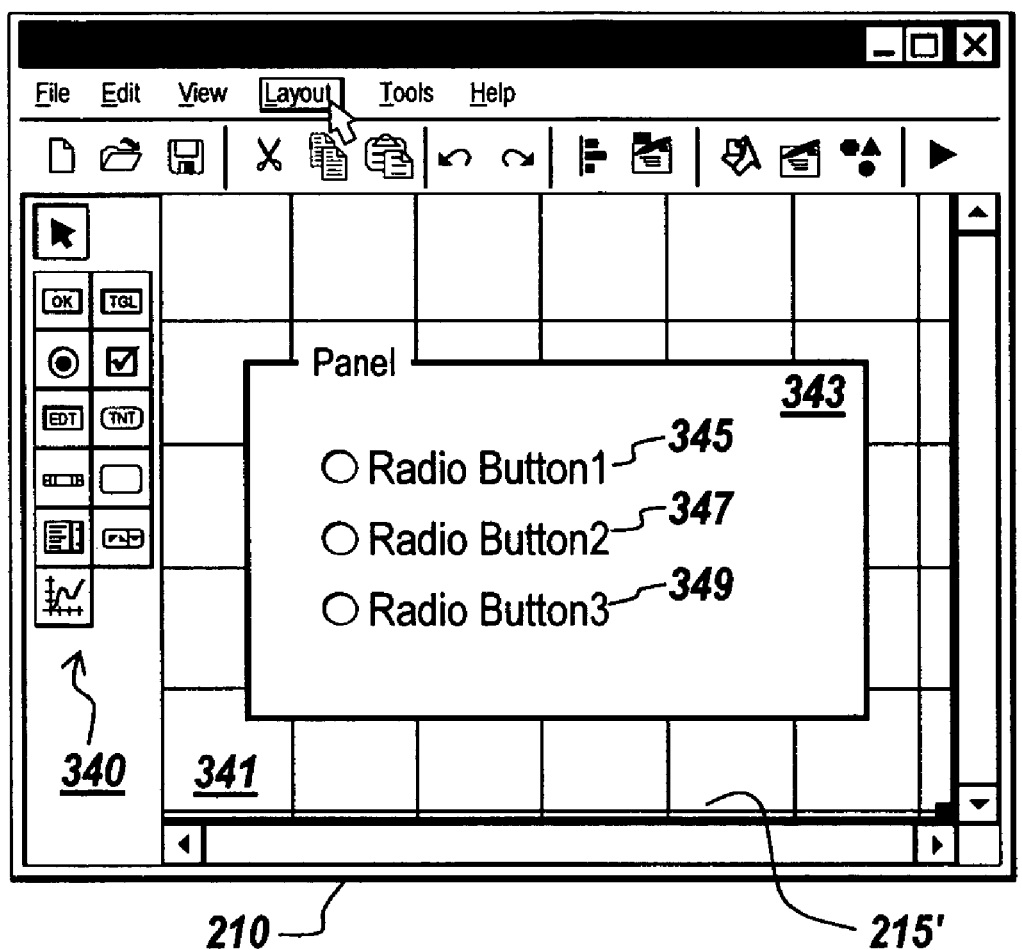
FIG. 3E is a diagrammatic view of another illustrative graphical user interface for practicing another embodiment of the present invention.
Figure 3F:
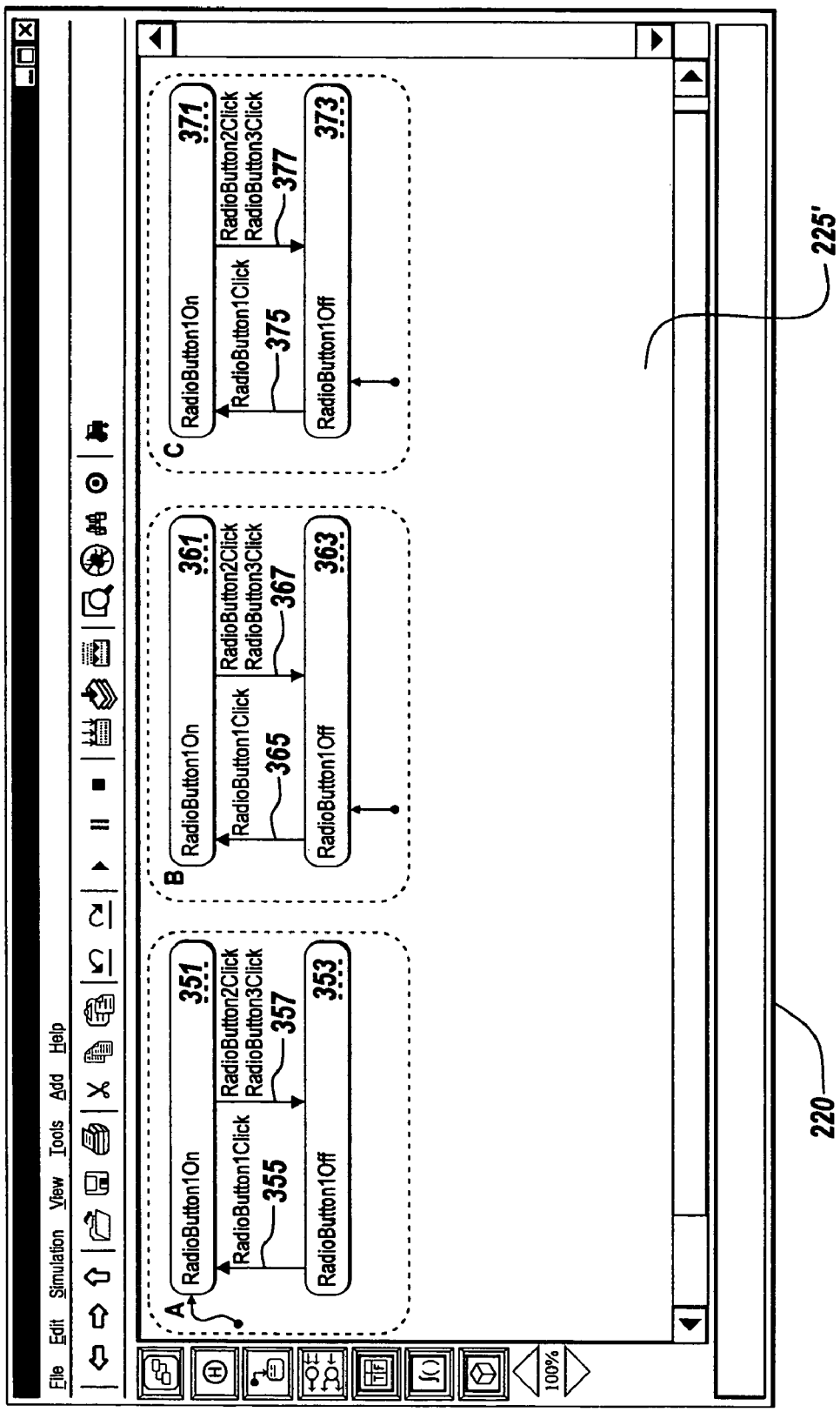
FIG. 3F is a diagrammatic view of an illustrative state diagram model representation of the illustrative graphical user interface of FIG. 3E.

FIG. 3E depicts another illustrative graphical user interface 215 for practicing another embodiment of the present invention. In brief overview, the graphical user interface 215' of FIG. 3E provides in the design layout 341 a panel widget 343 that includes three radio buttons of Radio Button1 345, Radio Button2, 347, and Radio Button3, 349. The radio buttons 345, 347, and 349 may be designed or configured to work in conjunction with each other so that only one of the radio buttons is selected at a time. In this example, using the techniques and steps of illustrative method 300, a state diagram model 225' as illustrated in FIG. 3F may be provided to represent the graphical user interface 215'. As illustrated in FIG. 3F, the state diagram model 225' may be considered a complete, full, or working implementation of the graphical user interface 215' of FIG. 3E. That is, the present invention may provide a state machine diagram model 225' that can be executed without further implementation or development to provide the graphical user interface 215' of FIG. 3E. However, one ordinarily skilled in the art will recognize and appreciate that although the state diagram model 225' of FIG. 3E may be a complete implementation of the graphical user interface 215' the state diagram model 225' may be further configured, modified, edited, or otherwise altered to provide a desired implementation of the graphical user interface 215' in the state diagram model 225'.

Additionally, the state diagram model 225' of FIG. 3F illustrates an event-based state diagram modeling approach that uses events associated with the radio buttons 345, 347, and 349 of the graphical user interface 215' to drive the state machine. In brief overview, the state diagram model 225' provides a state for each of the selected and unselected states of the radio buttons 345, 347, and 349. The RadioButton1On state 351 represents the selected states of Radio Button1 345 and RadioButton1Off state 352 represents the unselected state of Radio Button1 345. Likewise, RadioButton2On state 361 and RadioButton2Off state 363 represent the selected and unselected states of Radio Button2 347, and RadioButton3On state 371 and RadioButton3Off state 373 represent the selected and unselected states of Radio Button3, 349.

The respective click events of the radio buttons 345, 347, and 349 provide the transitions between the selected and unselected states of the radio buttons. For example, transitions between the RadioButton1On state 351 and the RadioButton1 Off state 352 are represented by transition elements 355 and 357 of the state diagram model 225'. The RadioButton1Click 353 represents a click event received via an input device or programmatically on Radio Button1 345. The click event of the Radio Button1 345 causes Radio Button1 345 to transition from the selected state of RadioButton1On 351 to the unselected state of RadioButton1Off 353 via the RadioButton1Click transition element 353. Any click events from Radio Button2 347 or Radio Button3 349 will cause either Radio Button2 347 or Radio Button3 349 to be selected and Radio Button1 345 to be unselected. In these cases, Radio Button1 349 will transition from the RadioButton1Off state 353 to the RadioButton1On state 351 via the transition element 357 that represents the button click events of Radio Button2 347 and/or Radio Button3 349. Likewise, the transition elements 365, 367, 375 and 377 provide representation of the transitions between the selected and unselected states of Radio Button2 347 and Radio Button3 349 respectively, according to the appropriate click events of the radio button elements of the graphical user interface 215'.

Figure 3G:
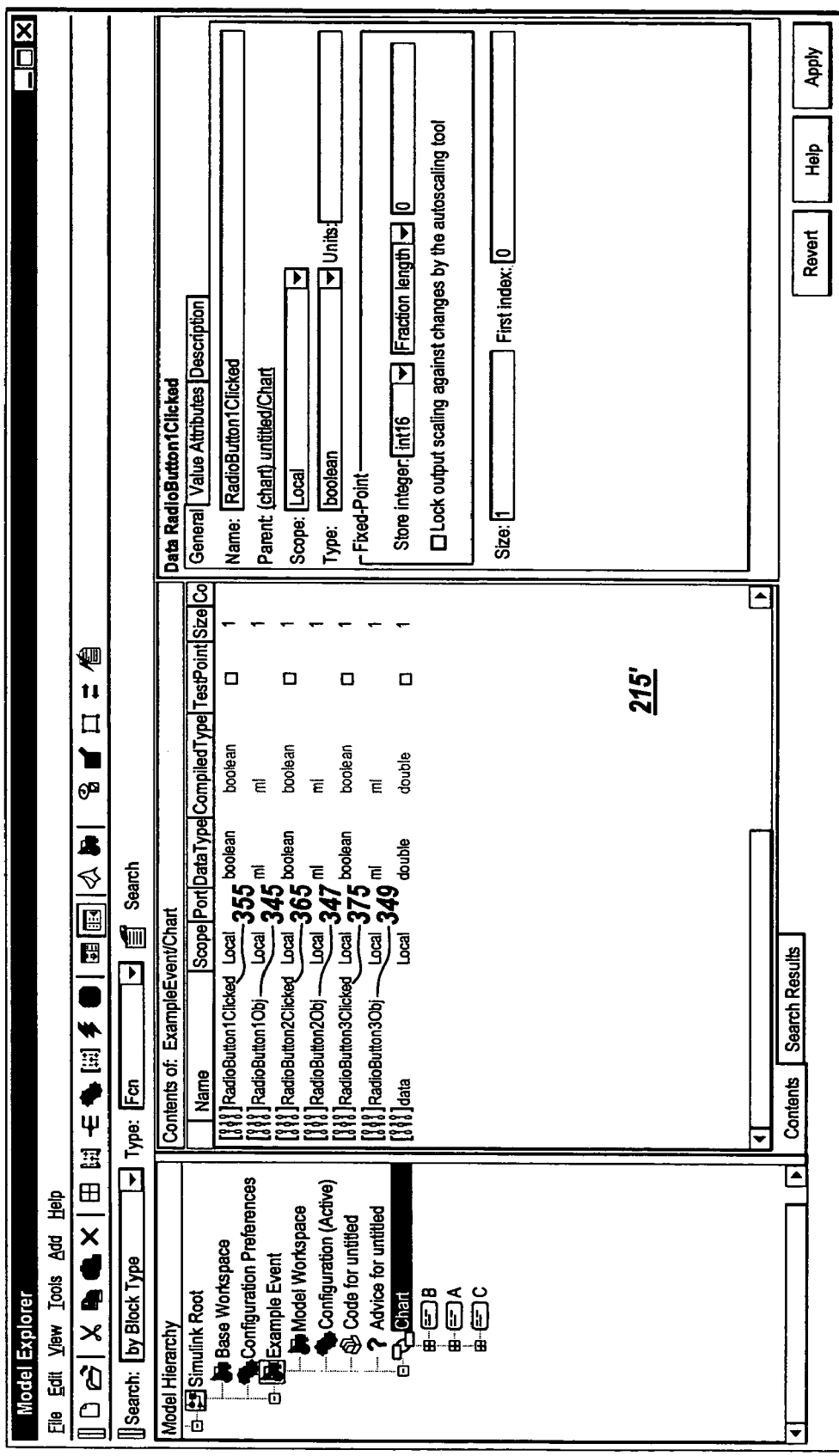
FIG. 3G is a diagrammatic view of an illustrative graphical user interface configuration environment for the illustrative state diagram model of FIG. 3F.

FIG. 3G depicts an illustrative graphical user interface 215 providing a configuration environment for creating, modifying, or configuring the events and user interface elements of by the graphical user interface 215' of FIG. 3E and the state diagram model 225' of FIG. 3F. In brief overview, each of the radio buttons 345, 347 and 349 of the graphical user interface 215' of FIG. 3E may comprise or be represented by objects in the GUI tool 210 and/or state diagram modeling tool 220. Additionally, any of the events related to the objects, such as the button clicks events of RadioButton1Clicked 355, RadioButton2Clicked 365, and the RadioButton3Clicked 375 may comprise or be represented by data elements, such as a Boolean data type element, in either the GUI tool 210 and/or the state diagram modeling tool 220. As illustrated in FIG. 3F, these click events drive the transition between the respective on (selected) and off (unselected) states of radio buttons 345, 347, and 349. One ordinarily skilled in the art will recognize that any of the elements of the graphical user interface and/or state diagram model may be provided or represented by any type and/or form of data element.

Figure 3H:
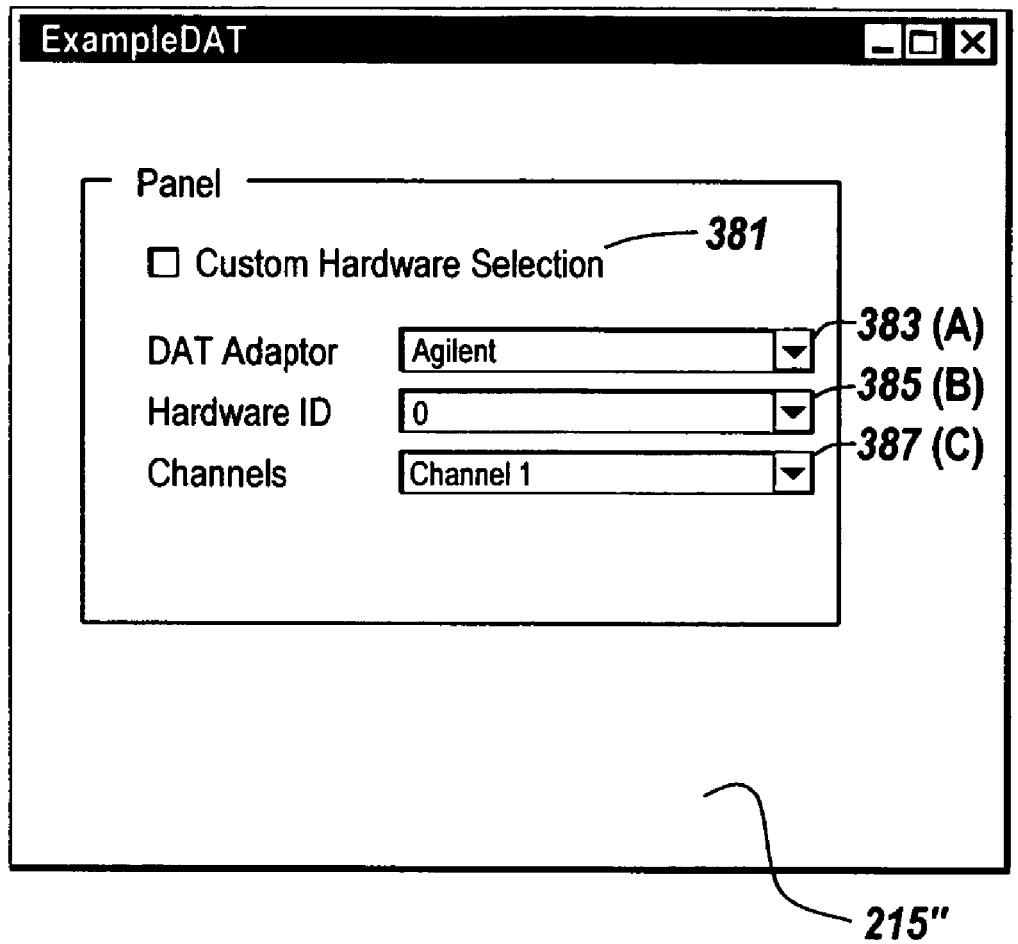
FIG. 3H is a diagrammatic view of a further illustrative graphical user interface for practicing an additional embodiment of the present invention.

FIG. 3H depicts another graphical user interface 215" illustrating the techniques of the present invention in providing a state diagram model representation of a graphical user interface. In brief overview, the graphical user interface 215" of FIG. 3H comprises a collection of related elements grouped into a panel. The custom hardware selection 381 element comprises a checkbox or an indicator if the custom hardware selection 381 is currently selected or not selected. In some embodiments, depending on the selection status of the custom hardware selection 381, the state and data of other elements may become active or enabled. For example, the choose box list elements of a DAT Adaptor 383 element, a Hardware ID 385 element and a Channels element 387 may be enabled when the custom hardware selection 381 is selected, and disabled or otherwise unselectable when the custom hardware selection 381 is not selected.

Figure 3I:
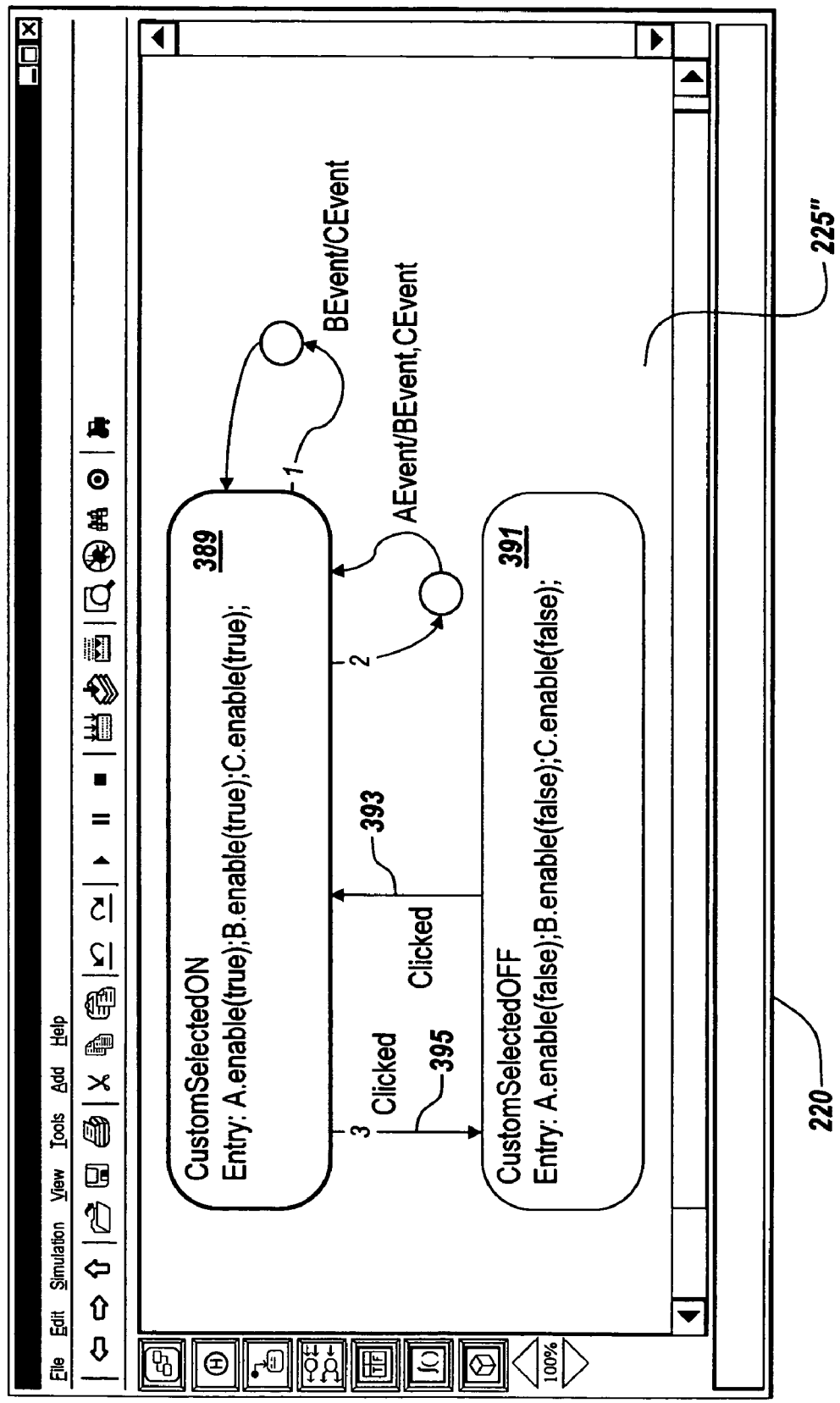
FIG. 3I is a diagrammatic view of an illustrative state diagram model representation of the illustrative graphical user interface of FIG. 3H.

Using an embodiment of the illustrative method 300, a state diagram model 225" may be provided as illustrated in FIG. 3I to represent the graphical user interface 215" of FIG. 3H. In this illustrative example, the click events of the custom hardware selection 381 are used to transition between a logical on and off state for selecting custom hardware in which the choose list elements 382, 385 and 387 are enabled or disabled. In brief overview, a CustomSelectedON 389 state may be used to represent the selected state of the custom hardware selection 381 and a CustomSelectedOFF 391 state may be used to represent the unselected state of the custom hardware selection 381. The CustomSelectedON state 389 may comprise logic, functionality, or executable instructions to enable each of the choose list elements 383, 385, and 387 so that they are selectable. Likewise, the CustomSelectedOFF state 391 may comprise logic, functionality, or executable instructions to disable each of the choose list elements 383, 385, and 387 so that they are not selectable. The transition between the states may be triggered via transition elements 393 and 395 which represent click events provided by the user interface element of the custom hardware selection 381. Additionally, the state diagram model 225" may use any of the click events from the choose-list elements 383, 385 and 387 as part of the implementation of the graphical user interface 215". For example, the Hardware ID choose-list element 385 may be context sensitive to the current selection of the DAT Adaptor choose-element 383 such that the selections provided by the Hardware ID choose-list element 385 may change based on the DAT Adaptor 383 selection.

Although the illustrative state diagram models 225 are generally discussed as being generated from an instance of a graphical user interface 215, the illustrative method 300 may be used in an interactive manner as the graphical user interface 215 is designed and developed. A state diagram model 225 may be generated for a graphical user interface 215 and if the graphical user interface 215 is updated or modified, the state diagram model 225 is accordingly updated or modified. In some embodiments, the initial state diagram model 225 may remain intact and additional elements added to the state diagram model 225 to represent and handle the new or additional functionality of the graphical user interface 215. For example, the graphical elements of the state diagram model 225 may remain connected as initially provided and new graphical elements may be added, connected, or incorporated to the existing state diagram model 225. In other embodiments, the state diagram model 225 may be changed in order to provide for changes to corresponding elements that changed in the graphical user interface 215. In further embodiments, the state diagram model 225 may be re-generated each time the graphical user interface is updated or modified. One ordinarily skilled in the art will recognize and appreciate the various ways the state diagram model may be generated, updated or modified to handle changes in the graphical user interface 215 during a design and development process.

Additionally, in another aspect of the present invention, a user may be able to filter, select, or otherwise choose which elements, events, data, functionality, and other portions of the graphical user interface 215 that may be represented by or added to a state diagram model 225. The user may be able to configure the GUI tool 210 and/or state diagram modeling tool 220 to provide desired preferences for which elements of the graphical user interface 215 will be considered for implementation in a state diagram model 225. For example, one or more widgets of the graphical user interface 215 may have a long list of events to consider. The user may be able to filter the list and select only the most commonly used events or select a subset of desired events for implementation in a state diagram model 225. Any type and/or form of a suitable configuration mechanism, such as a graphical user interface or command line interface, may be used to select or filter any portion of the graphical user interface 215 to be represented by or added to a state diagram model 225.

Although the state diagram model 225 is generally described and illustrated as provided by a state diagram modeling tool 220 such as Stateflow® and/or Simulink®, the state diagram model 225 may comprise other types of graphical models and visual formalisms provided by any other type and/or form of visual or graphical modeling tool. As such, the state diagram model 225 may comprise constructs and elements, graphical or otherwise, relevant to the type and/or form of state diagram model 225 and/or state diagram modeling tool 220.

In some embodiments, the state diagram modeling tool 220 may comprise any type and/or form of event modeling and simulation tool, such as any discrete, continuous or hybrid event simulation system. For example, the state diagram modeling tool 220 may comprise any of the event modeling and simulation tools manufactured by Imagine That, Inc. of San Jose, Calif., or Simul8 Corporation of Boston, Mass. Accordingly, the state diagram model 225 may comprise a visual formalism or graphical model representing a continuous, discrete, or event modeling system. As one ordinarily skilled in the art will recognize and appreciate, an event modeling tool 220 and diagram model 225 may represent system behavior that can be expressed in terms of what a system does in correspondence to an event or a certain number of event types, and may use model constructs or elements representing queues and/or servers. For example, in a state diagram model 225, a queue element may represent a queue of events, and a server element may represent an event server that processes events from the queue.

In some embodiments, the state diagram modeling tool 220 may comprise any type and/or form of Petri net modeling and simulation tool. For example, the state diagram modeling tool 220 may comprise any of the Petri modeling and simulation libraries or tools manufactured by Dynasim AB of Lund, Sweden. The state diagram model 225 may comprise a visual formalism or graphical model representing a Petri net model or system. As one ordinarily skilled in the art will recognize and appreciate, a Petri net is a graphical and mathematical modeling tool that provides a mathematical expression of discrete distributed systems and may be expressed in terms of places, transitions, and arcs that connect them. Petri nets may be used to describe and model systems that may be characterized as being concurrent, asynchronous, distributed, parallel, nondeterministic, and/or stochastic. Additionally, tokens or tickets are used in Petri nets to simulate the dynamic and concurrent activities of systems. Accordingly, the state diagram model 225 may comprise any type and/or form of constructs and elements representing a Petri net model, such as a place, a transition, an arc, a token or a ticket as one ordinarily skilled in the art will recognize and appreciate.

In one aspect, the present invention is related to executing a state machine representation of a graphical user interface 215. A state machine diagram model 225 for a graphical user interface 215 may be generated using the design and development techniques of the present invention as described above. The state machine diagram model 225 may be executed in an executable form, either in an interpretative mode or in the accelerated mode. In interpretative mode, either the state diagram modeling tool 220 and/or graphical model simulation tool 230 can execute a state diagram model 225 and/or graphical model 235 in their respective environments in a graphical fashion. In other embodiments, code can be generated from the state diagram model 225 and/or graphical model 235 to build an executable program for the accelerated mode.

Figure 4A:
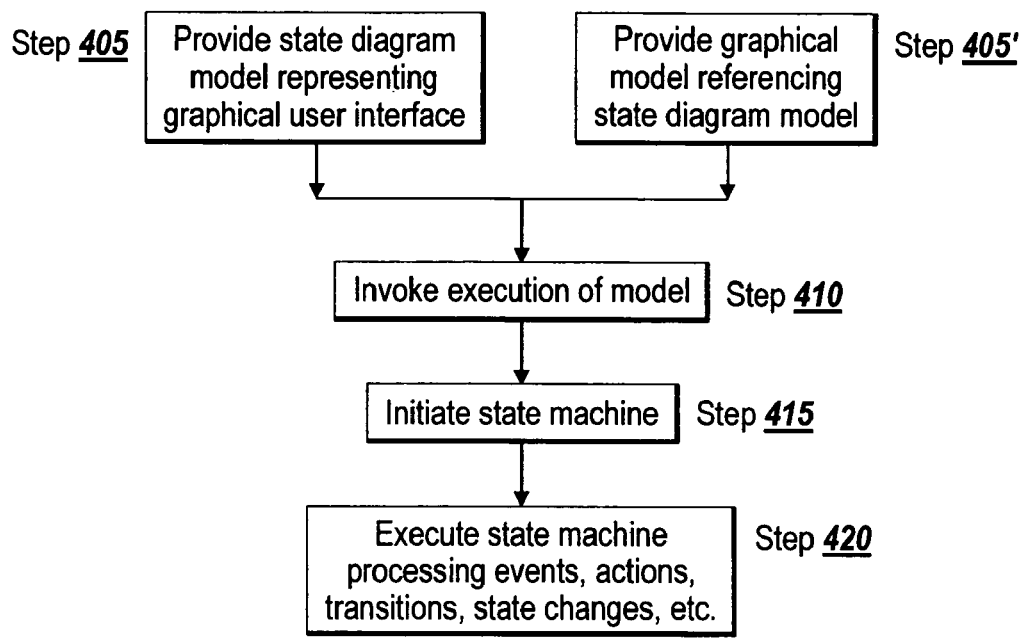
FIG. 4A is a flow diagram depicting an illustrative method for practicing an embodiment of the present invention to execute the illustrative graphical user interface and state diagram model of FIGS. 4B and 4C.
Figure 4B:
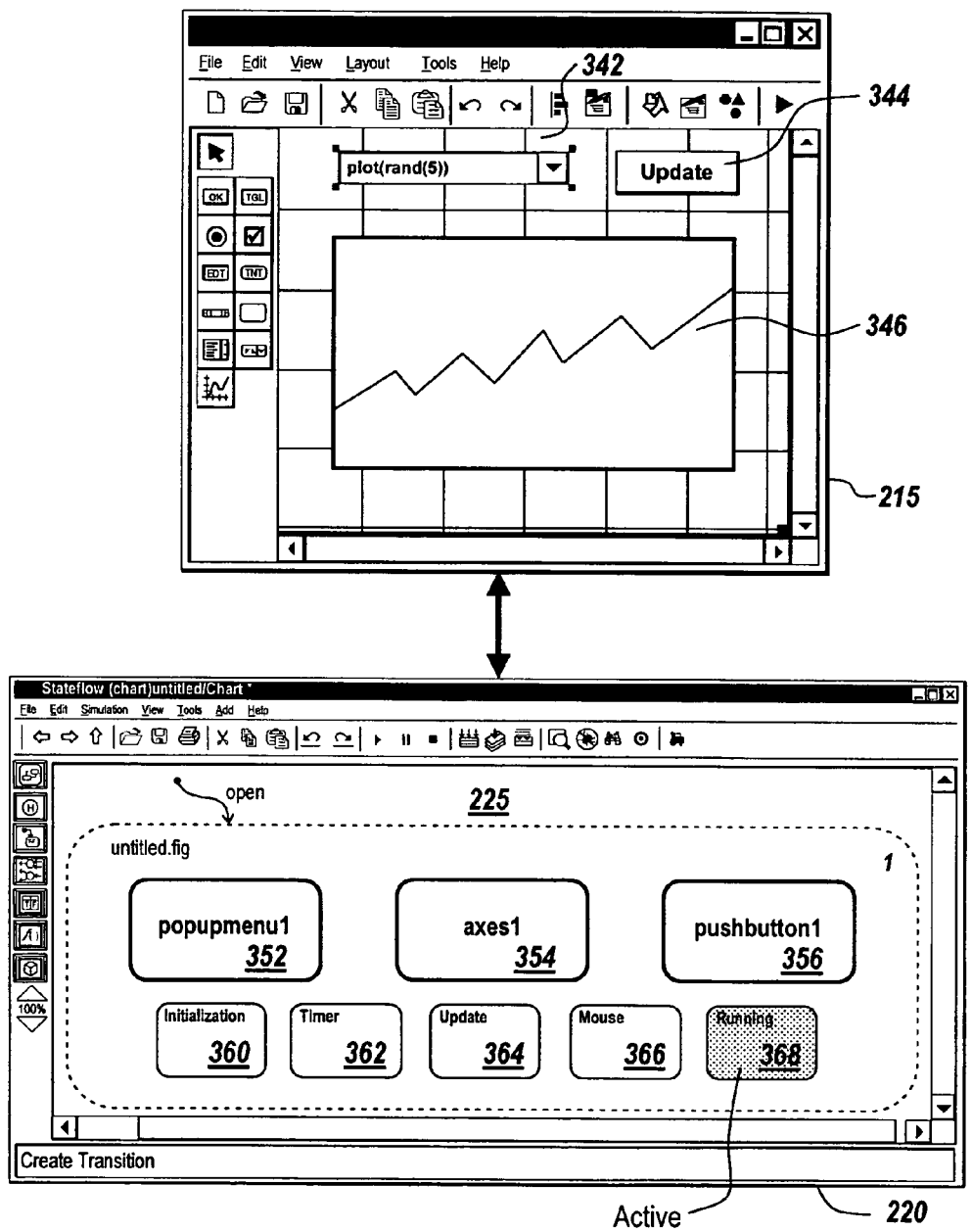
FIG. 4B is a diagrammatic view of an illustrative execution of a state diagram model and graphical user interface for practicing an embodiment of the present invention.
Figure 4C:
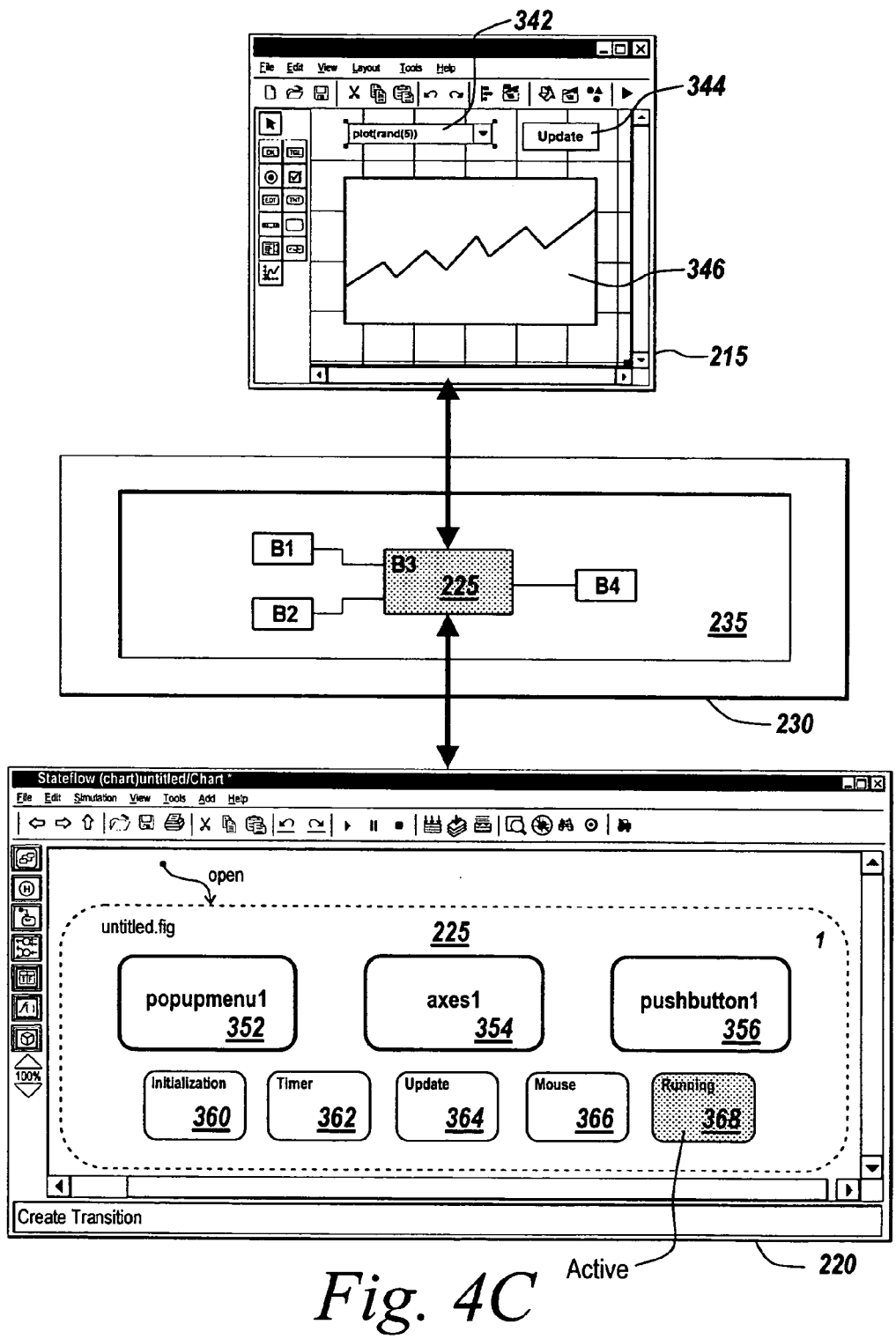
FIG. 4C is a diagrammatic view of an illustrative execution of a state diagram model and graphical user interface for practicing another embodiment of the present invention.

FIG. 4A depicts an illustrative method 400 for executing a state machine diagram model 225, such as a state machine diagram model 225 provided by illustrative method 300 and as illustrated in FIGS. 4B and 4C. In one embodiment as depicted in FIG. 4B, a state machine diagram model 225 is provided to a state diagram modeling tool 220 at step 405. In another embodiment as depicted in FIG. 4C, at step 405', a graphical model 235 referencing a state machine diagram model 225 is provided to the graphical model simulation tool 230. As depicted in FIG. 4C, the illustrative graphical model 235 may comprise a block diagram model, such as one that may be generated with Simulink®. The block diagram model may comprise one or more functional blocks B1-B4, and may have a block B3 incorporating, referencing, or otherwise using the state machine diagram model 235.

At step 410 of the illustrative method 400, the model 225 or 235 may be invoked for execution by any suitable means and/or mechanisms provided by the state diagram modeling tool 210 and the graphical model simulation tool 220 respectively. In one embodiment, the state machine diagram model 225 is invoked for execution in the state diagram modeling tool 210 to display and execute the graphical user interface 215 as illustrated in FIG. 4B. In another embodiment, the graphical model 235 referencing the state machine diagram model 225 is invoked for execution in the graphical model simulation tool 220 to execute the graphical model 235 and to display and execute the graphical user interface 215 as illustrated in FIG. 4C.

At step 415 of the illustrative method 400, the present invention initiates the state machine for the graphical user interface 215 as specified by the state machine diagram model 225. Upon initiation of the state machine, one or more default transitions may be executed for one or more initial states, along with any configured state, condition and transition actions and any other executable instructions forming the functionality desired upon invoking the graphical user interface 215. The state machine completes initialization and waits for activity related to the graphical user interface 215. In one embodiment, the graphical user interface 215, as illustrated in either FIG. 4B or 4C, is displayed upon or during initiation of the state machine, and in another embodiment, after the state machine has completed initialization.

As depicted in FIG. 4B, the state diagram modeling tool 220 provides a graphical display of execution for visualizing the states and status of the state machine, such as the active or inactive status of states 360, 362, 364, 366 and 368. In FIG. 4B, for illustrative purposes, the running state 368 is indicated as active to depict the running of the state machine. Likewise, as depicted in FIG. 4C, the graphical model simulation tool 230 in conjunction with the state diagram modeling tool 220 displays graphically the state and activity of execution, such as the active status of the running state 368.

At step 420 of the illustrative method 400, the state machine of the present invention executes in accordance with the activity generated by a user using the graphical user interface 215. As the user provides input to the graphical user interface 215, the input is received and events generated which are processed by the state machine of the state diagram model 225. In other embodiments, input to the graphical user interface 215 may be provided programmatically from another program or any other type of executable instruction, for example, via an application programming interface (API).

By way of example, a user may select the selection of "plot(rand(5))" from the combo-box element 342 of the graphical user interface 215. This may cause the "popup-menu1" state 352 associated with the combo-box element 342 to become active and execute any actions and sub-states associated with the state 352. The underlying state and control structure of the graphical user interface 215 provided by the state machine diagram model 225 may track the current selection "plot(rand(5))" by any suitable mechanism and/or means, such as by executable instructions 355. The user may also select the update command button 344 element to update the graph provided by the axes element 346. The update command button 344 will update the graph 346 according to the selection of combo-box element 342. The update command 344 selection event may accordingly be handled and processed by the pushbutton1 state 356. As a result, the axes1 state 354 may also be executed and processed, and the axes element 346 updated with new data points.

Although generally described above with some illustrative user interface elements 342, 344 and 346 associated with illustrative states 352, 354 and 356, one ordinarily skilled in the art will recognize and appreciate that the specification and execution of the state machine diagram model 225 will depend on and vary with the design, development and execution of the graphical user interface 215, and the inputs that may be applied to the graphical user interface 215 in a particular instance of execution.

In another aspect, the present invention is directed toward generating code from the state machine diagram model 225 and/or graphical model 235 referencing the state machine diagram model 225 to provide an executable form of the state machine implementation of the graphical user interface 215. An illustrative method 500 of FIG. 5A and system 502 of FIG. 5B of the present invention will used to discuss the operations, functions and structure of the code generation techniques of the present invention. Referring to FIG. 5B, in brief overview, the code generating system 502 comprises a code building tool 590 having a code generator 520. In an exemplary embodiment of a graphical user interface development and execution environment 120 of MATLAB® and Simulink®, the code building tool 590 comprises the Stateflow® Coder integrated with Real-Time Workshop®, both manufactured by The Mathworks, Inc.

Figure 5A:
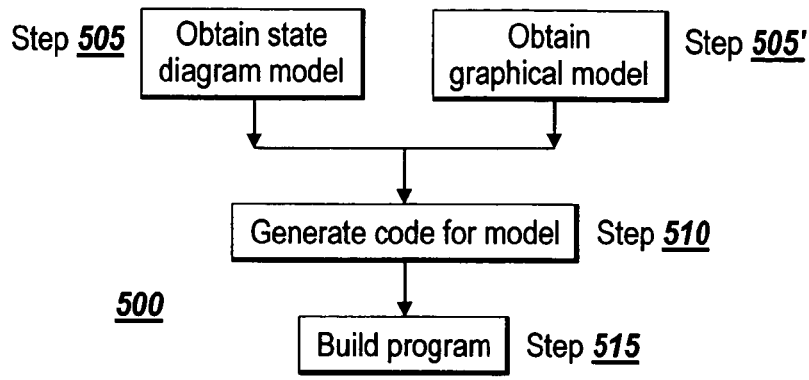
FIG. 5A is a flow diagram depicting an illustrative method for practicing an embodiment of the present invention to generate code for an illustrative graphical user interface and state diagram model.
Figure 5B:
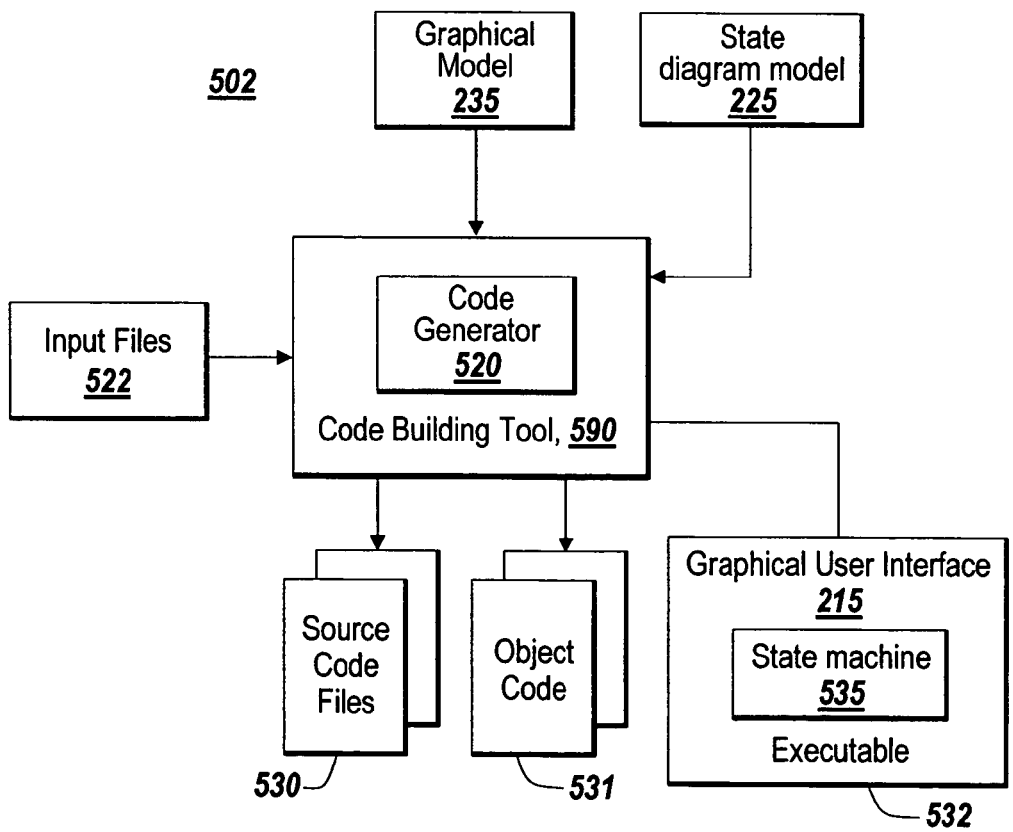
FIG. 5B is a block diagram of an illustrative code generation system for practicing an embodiment of the present invention.

Referring to FIG. 5A, the illustrative method 500 of the present invention obtains either a state machine diagram model 225 at step 505, or in another embodiment, a graphical model 235 referencing the state machine diagram model 225 at step 505'. In some embodiments, the state machine diagram model 225 and/or the graphical model 235 may be obtained via a file. The state machine diagram model 225 and/or the graphical model 235 may comprise a file in a format that the code building tool 590 or code generator 520 can read and that follows a file specification for defining state machines and other elements of the state machine diagram model 225. In other embodiments, the code building tool 590 and/or code generator 520 may obtain either the state machine diagram model 224 and/or the graphical model 235 from an application programming interface (API) call to another application or via an interface to another environment, such as the state diagram modeling tool 210. In yet a further embodiment, the graphical mode simulation tool 230 and/or the state diagram modeling tool 210, or another computer program, saves and converts the state machine diagram model 225 and/or graphical model 235 into a format readable by the code building tool 590. For example, a graphical model 235 produced with Simulink® and Stateflow® may be converted into an intermediate model file representation such as an .rtw type file readable by the automatic code generator of Real-Time Workshop®.

At step 510 of illustrative method 500, the code building tool 190, such as Stateflow® Coder and/or Real-Time Workshop®, will generate code for the graphical model 235 and/or state machine diagram model 225. The code building tool 590 and code generator 520 use one or more input files 522 in conjunction with reading and processing the graphical model 235 and/or state machine diagram model 225.

The one or more input files 522 may comprise files including templates, commands, input parameters, configuration data, source code, data and class definitions, component configuration, device driver or any other information that may be used by the code generator 520 to generate code for the graphical model 235 and/or state machine diagram model 225. The input files 522 may include files to provide input to and configure the code generator 520 to generate source code files 530 for a specific target hardware platform, for example, a specific processor. In an exemplary embodiment of Real-Time Workshop® as the code generator 520, Real-Time Workshop® uses target language compiler script files, with a .tlc file extension, as input files 522 to the code generation process. The .tlc files provide sections of programming instructions to be implemented for block and element references as they may be found in the graphical model 235 and state machine diagram model 235 during the code generation process. The .tlc files also can provide data and class definitions for data element references found in the graphical model 235 and/or state machine diagram model 225. Additionally, the .tlc files also comprise compiler directives, built-in functions and other code generation commands to direct Real-Time Workshop® during the code generation process.

In operation, the code generator 520 reads in information regarding or a representation of the graphical model 235 and/or state machine diagram model 225 and uses the input files 522 to generate code by translating the graphical model 235 and/or the state machine diagram model 225 into one or more source code files 530. By way of example, the automatic code generation can be discussed in terms of generating code with Real-Time Workshop® from a block model diagram 215 generated with Simulink®. Simulink® creates and stores block diagram models 235 into model files with an .mdl file extension. As part of the code generation process, Real-Time Workshop® reads in an .mdl model file and analyzes the model to generate an intermediate model file with an .rtw extension. This intermediate .rtw model file comprises a hierarchical structure of records describing systems and their blocks and connections analyzed from a block diagram model 235 of the .mdl file.

A language compiler called the target language compiler of Real-Time Workshop® works with .tlc files and .rtw files to produce code. The target language compiler interprets a program that reads the intermediate model file description of an .rtw file. As the target language compiler encounter a record in the .rtw file, it uses directives in the .tlc files corresponding to the record to direct the code generation process for the specific record. As such, the target language compiler works much like a text processor. For example, the target language compiler uses block .tlc files, which specify the particular code for a block, to transform each block into code. When it reads a record in the .rtw file that references a block, the target language compiler applies code from the corresponding block .tlc file to generate code for the block in source code files 522. Additionally, model wide .tlc files are also used to provide input to the target language compiler for global customization of the code. Model wide .tlc files may direct the target language compiler to generate main routines to provide entry points into the program, source code header files to setup data structures, and utility functions to support code for particular blocks. The block and model wide .tlc files can be modified to generate customized code for blocks and to generate any desired global customizations to the code.

The source code files 530 generated from the code generator 520, such as Real-Time Workshop®, may comprise program instructions of a programming language, such as C, which may further be in a format and style following the ANSI/ISO C standard. Additionally, the source code files 530 may be generated to comprise fixed-point or floating-point source code. The programming instructions of the source code files 530 may be generated to run on any real-time operating system or for a specific processor. In a further embodiment, the programming instructions of the source code files 530 may be optimized for performance or versatility, and/or for a specific target hardware platform. In another embodiment, the code generator 520 can be configured via the input files 522 to generate custom source code comprising a style and format as directed by the input files 522. The code generator 520 can be also configured via the input files 522 to provide customized source code to support such customizations as error handling, optimization, code and data reduction, code reusability, scoping of variables, and other characteristics of the source code that may be modified during the source code generation process.

In some embodiments, a portion of the source code 530 or object code 531 generated or provided by illustrative method 500 may be targeted to run on a specific computational hardware device, such as an embedded hardware platform, or a specific processor of a computing device 102 and another portion may be targeted to run on a personal computer, such as a desktop or notebook. For example, a portion of the graphical user interface 215 and/or state diagram model 220 may process data or perform loops that are time critical. In comparison, the display may not need to be updated in a time critical manner as the viewer's eyes may only perceive updates at a certain rate. The time critical data processing or loops may be embodied in source code 530 and/or object code 531 targeted for a specific processor of a certain speed or capability and the non-time critical code 530, 531 may be targeted for any general computing device. One ordinarily skilled in the art will recognize and appreciate the various ways to process and target various portions of code to meet the desired functionality and/or execution of the user interface 215 and/or state diagram model 225.

At step 515 of illustrative method 500, one or more programs may be built from the automatically generated code to provide an executable form to execute the graphical user interface 215 with a state machine. The code building tool 590 also provides for the building of the source code files 530 into object code 531 to generate one or more programs to run on a target platform and/or operating system. As depicted in FIG. 5B, the executable form 532 may include a portion to execute and display the graphical user interface 215 with a state machine 535 designed and provided by the state machine diagram model 225.

The build process of illustrative step 515 of the present invention may include compiling the code and linking libraries, drivers, and other programs via a make program or some other compiling utility. In one embodiment, the code building tool 590 invokes a compiler provided by software available with the operating system, such as a make utility on a UNIX operating system. In another embodiment, the compiler may be provided from a software development package such as Visual C/C++ from Microsoft Corporation of Redmond, Wash. One ordinarily skilled in the art will recognize the code building tool 590 may invoke any type of compiler that is configured to and capable of translating the source code 530 into object code 531 to be executed by the target computing device 102.

Although the code generator 520 is generally discussed in terms of generating source code, the code generator 520 may provide code in any other form, such as object code, pre-existing source code, or other programmable instructions suitable for representing the functionality of the graphical model 235 and state machine diagram model 225. Additionally, although the illustrative embodiment of the present invention is discussed in terms of source code files 530 and object code 531 from a programming language like C, the code generator 520 may generate any type of programming related output, such as an interpreted programming language and/or scripting language. For example, the code generator 520 may generate code for per, awk, VBscript, Javascript, tcl, or the technical computing programming language of MATLAB®. In other cases, the code generator 520 may generate output in other types of languages, such as the hardware description language of HDL. One ordinarily skilled in the art will recognize the various types of languages the code building tool may apply in generating code and how the code generator may build the code based on the type of language.

In view of the structure, functions and operations of the systems and methods as described herein, the present invention provides techniques for designing, developing and executing a state machine representation of a graphical user interface that is well-suited for handling the event driven and parallelism paradigms of user interfaces. Additionally, the present invention integrates a higher level textual programming language into the state machine modeling to provide for the functionality of the graphical user interface. The approach of the present invention simplifies graphical user interface design and development.

Furthermore, the present invention provides a visual formalism for design and developing a graphical user interface that also provides a model-based design approach. The term "model-based design" is used to refer to a graphical model acting as a design. A model-based design may be used as a design specification for an implementation, such as an implementation of a graphical state machine diagram representation of a graphical user interface. As a design specification, a model-based design can drive the building process of an implementation of the design. For instance, the model-based design can act as a specification for a graphical user interface from which to automatically generate code from a graphical model or state machine diagram model.

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

What is claimed is:

1. A computer-implemented method for providing a graphical state diagram model based on a graphical user interface, the method comprising:
   providing a graphical user interface comprising one or more graphical elements;
   generating, from the graphical user interface, using a processor, a graphical state diagram model that is based on the graphical user interface, the graphical state diagram model providing a graphical state machine representation of the graphical user interface comprising one or more states representing a state of the one or more graphical elements in the graphical user interface; and
   providing a tool for modifying the graphical user interface, wherein the graphical state diagram model is updated to reflect a modification of the graphical user interface, the graphical state diagram model being updated dynamically as the graphical user interface is changed without regenerating the graphical state diagram model.

2. The method of claim 1, wherein the one or more graphical elements comprise at least one of a push button, a slider, a radio button, a check box, a text field, a pop-up menu, a list box, a toggle button, a panel, a button group, or a technical widget.

3. The method of claim 1, comprising providing, in the graphical state diagram model, a state diagram element identifying a state of the graphical state machine representing an event associated with a graphical element of the one or more graphical elements.

4. The method of claim 1, comprising providing a graphical state diagram element comprising at least one of a data element, an event, a truth table, a graphical function, a place, a queue, a ticket, or a token.

5. The method of claim 1, comprising providing executable instructions associated with the graphical state diagram model representing a portion of processing of an event associated with a graphical element of the one or more graphical elements.

6. The method of claim 1, comprising providing one or more of the following graphical state machine elements to represent a portion of the graphical user interface: a state, a transition from a state, a transition to a state, a decision point junction between states, and a condition associated with a transition.

7. The method of claim 1, comprising providing an executable action associated with one of the following graphical state machine elements to represent a portion of the graphical user interface: a state, a transition, and a condition.

8. The method of claim 1, wherein the graphical state machine represents at least one of a partial implementation or a complete implementation of the graphical user interface.

9. The method of claim 1, wherein the graphical state machine comprises at least one of a finite or a non-deterministic state machine.

10. A computer-implemented system for providing a graphical user interface via a graphical state diagram model representation, the system comprising:
    a memory for storing a graphical user interface;
    a processor providing:
       a graphical user interface tool providing a graphical user interface having one or more graphical elements; and
       a state diagram modeling tool, in communication with the graphical user interface tool, the state diagram tool generating a graphical state diagram model based on the graphical user interface, the graphical state diagram model providing a graphical state machine representation of the graphical user interface comprising one or more states representing a state of the one or more graphical elements in the graphical user interface, wherein the graphical state diagram model is updated in response to a change in the graphical user interface to reflect the change in the graphical user interface without regenerating the graphical state diagram model when the graphical user interface is changed.

11. The system of claim 10, wherein at least one of the graphical user interface tool or the state diagram modeling tool executes on at least one of a first computing device or a second computing device.

12. The system of claim 10, wherein at least one of the graphical user interface tool or the state diagram modeling tool generates the graphical state diagram model from the graphical user interface via an application programming interface of the state diagram modeling tool.

13. The system of claim 10, wherein the graphical user interface tool generates the graphical state diagram model in the state diagram modeling tool upon saving the graphical user interface.

14. The system of claim 10, wherein an element of a graphical state machine identifying a state of the graphical state machine represents at least one of a state of the one or more graphical elements or a state of an event associated with the one or more graphical elements.

15. The system of claim 10, wherein the graphical state diagram model comprises executable instructions representing a portion of event processing associated with an event of the one or more graphical elements.

16. The system of claim 10, wherein the state diagram tool executes the graphical state diagram model to provide the graphical user interface.

17. The system of claim 10, wherein the state diagram modeling tool executes a portion of a graphical state machine in response to an input provided to the one or more graphical elements.

18. The system of claim 10, wherein the state diagram modeling tool executes executable instructions associated with a state of a graphical state machine in response to an event provided by the one or more graphical elements.

19. The system of claim 10, comprising a code generator tool to generate code from the graphical state diagram model to provide an executable form of at least one of the graphical user interface or the graphical state diagram model.

20. A device readable storage medium storing device readable instructions that when executed by a processor provide a state diagram model representation of a graphical user interface, the instructions comprising:
- instructions for providing a graphical user interface comprising one or more graphical elements with a graphical user interface tool;
- instructions for generating, from the graphical user interface, a graphical state diagram model that is based on the graphical user interface, the graphical state diagram model providing a graphical state machine representation of the graphical user interface comprising one or more states representing a state of the one or more graphical elements in the graphical user interface; and
- instructions for updating the graphical state diagram model in response to an input activity in the graphical user interface tool, the input activity comprising at least one of adding a graphical element to the graphical user interface or changing one of the graphical elements in the graphical user interface, wherein the graphical state diagram model is updated to reflect the change in the graphical user interface.

21. The medium of claim 20, wherein the one or more graphical elements comprises one of a push button, a slider, a radio button, a check box, a text field, a pop-up menu, a list box, a toggle button, a panel, and a button group.

22. The medium of claim 20, comprising providing, in the graphical state diagram model, a state diagram element identifying a state of the graphical state machine representing an event associated with a graphical element of the one or more graphical elements.

23. The medium of claim 20, comprising providing a graphical state diagram element comprising at least one of a data element, an event, a truth table, a graphical function, a place, a queue, a ticket, or a token.

24. The medium of claim 20, comprising providing executable instructions associated with the state diagram model representing a portion of processing of an event associated with a graphical element of the one or more graphical elements.

25. The medium of claim 20, comprising providing one or more of the following graphical state machine elements to represent a portion of the graphical user interface: a state, a transition from a state, a transition to a state, a decision point junction between states, and a condition associated with a transition.

26. The medium of claim 20, comprising providing an executable action associated with one of the following graphical state machine elements to represent a portion of the graphical user interface: a state, a transition, and a condition.

27. The medium of claim 20, wherein the graphical state machine represents at least one of a partial implementation or a complete implementation of the graphical user interface.

28. The medium of claim 20, wherein the graphical state machine comprises at least one of a finite or a non-deterministic state machine.

29. A computer-implemented distribution system for transmitting device readable instructions for providing a state diagram model based on a graphical user interface, the instructions comprising:
- instructions for providing a graphical user interface comprising one or more graphical elements;
- instructions for generating, from the graphical user interface, using a processor of a computer, a graphical state diagram model based on the graphical user interface, the graphical state diagram model providing a graphical state machine representation of the graphical user interface comprising one or more states representing a state of the one or more graphical elements in the graphical user interface; and
- instructions for updating, using the processor, the graphical state diagram model in response to a change to the graphical user interface, wherein the graphical state diagram model is updated to reflect the change to the graphical user interface, wherein only a portion of the graphical state diagram model is generated in response to the change in the graphical user interface.

* * * * *